US009117485B2

(12) United States Patent
Ogawa et al.

(10) Patent No.: US 9,117,485 B2
(45) Date of Patent: Aug. 25, 2015

(54) SIGNAL PROCESSING APPARATUS CAPABLE OF SUPPRESSING NON-LINEAR NOISE COMPONENT DURING READING OPTICAL RECORDING MEDIUM

(71) Applicant: Kabushiki Kaisha Toshiba, Minato-ku (JP)

(72) Inventors: Akihito Ogawa, Fujisawa (JP); Kazuaki Doi, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/487,689

(22) Filed: Sep. 16, 2014

(65) Prior Publication Data
US 2015/0003225 A1   Jan. 1, 2015

Related U.S. Application Data

(63) Continuation of application No. PCT/JP2012/056918, filed on Mar. 16, 2012.

(51) Int. Cl.
G11B 7/00      (2006.01)
G11B 20/10     (2006.01)
G11B 7/005     (2006.01)

(52) U.S. Cl.
CPC .......... *G11B 20/10046* (2013.01); *G11B 7/005* (2013.01); *G11B 20/10268* (2013.01)

(58) Field of Classification Search
USPC ............... 369/124.1, 124.11, 124.12, 124.13, 369/124.14, 124.01, 124.02, 124.03; 375/296, 299
See application file for complete search history.

(56) References Cited

U.S. PATENT DOCUMENTS

| 5,995,545 A * | 11/1999 | Ueno ............................. 375/233 |
| 6,185,175 B1 * | 2/2001 | Zook ........................... 369/53.35 |
| 2003/0026028 A1 | 2/2003 | Ichihara et al. |
| 2003/0197965 A1 * | 10/2003 | Sternad et al. .................. 360/65 |
| 2005/0063276 A1 * | 3/2005 | Ogura ........................ 369/59.22 |
| 2007/0237059 A1 * | 10/2007 | Kasahara ................... 369/124.1 |
| 2009/0257334 A1 * | 10/2009 | Ogura et al. ............... 369/59.23 |

(Continued)

FOREIGN PATENT DOCUMENTS

| JP | 2002-117585 A | 4/2002 |
| JP | 2002-367291 A | 12/2002 |
| JP | 2005-122862 A | 5/2005 |

(Continued)

OTHER PUBLICATIONS

Computer Translation of JP 2011-192377 ( Inoue et al, Sep. 29, 2011).*

(Continued)

*Primary Examiner* — Tan X Dinh
(74) *Attorney, Agent, or Firm* — Oblon, McClelland, Maier & Neustadt, L.L.P.

(57) ABSTRACT

According to an embodiment, a signal processing apparatus includes a first signal processor, a second signal processor and a third signal processor. The first signal processor suppresses an offset component remaining in a reproduction signal read from an optical recording medium to obtain a first signal. The second signal processor suppresses a nonlinear distortion component remaining in the first signal to obtain a second signal. The third signal processor suppresses a correlation noise component remaining in the second signal to obtain a third signal.

4 Claims, 23 Drawing Sheets

(56) References Cited

U.S. PATENT DOCUMENTS

2013/0044791 A1* 2/2013 Rimini et al. ............ 375/219
2013/0094343 A1 4/2013 Ogawa et al.

FOREIGN PATENT DOCUMENTS

| JP | 2006-313592 A | 11/2006 |
| JP | 2008-243299 A | 10/2008 |
| JP | 2011-192377 A | 9/2011 |

OTHER PUBLICATIONS

International Preliminary Report on Patentability issued Sep. 25, 2014 in PCT/JP2012/56918 (submitting English translation only).
Written Opinion issued Apr. 17, 2012 in PCT/JP2012/56918 (submitting English translation only).
Junya Shiraishi, et al., "New Signal Quality Evaluation Method for 33.4GB/Layer BDs", International Symposium on Optical Memory 2009 proceedings, 2009, 2 Pages.
Japanese Office Action issued Nov. 18, 2014, in Japan Patent Application No. 2014-504598 (with English translation).
International Search Report mailed Apr. 17, 2012 for PCT/JP2012/056918 filed on Mar. 16, 2012 with English Translation.
Toshiyuki Nakagawa, et al., Adaptive Third-Order Volterra Filter for High-Density Read-Only Blu-Ray Disc, Japanese Journal of Applied Physics, Feb. 24, 2006, vol. 45, No. 2B, pp. 1084-1087.
Seiichi Mita, et al., Jiki Disk no Shingo Shori Gijutsu —PRML Hoshiki no Kiso to Jissai—Morikita Publishing Co. Ltd., Sep. 7, 2010, pp. 99-102 without Translation.

* cited by examiner

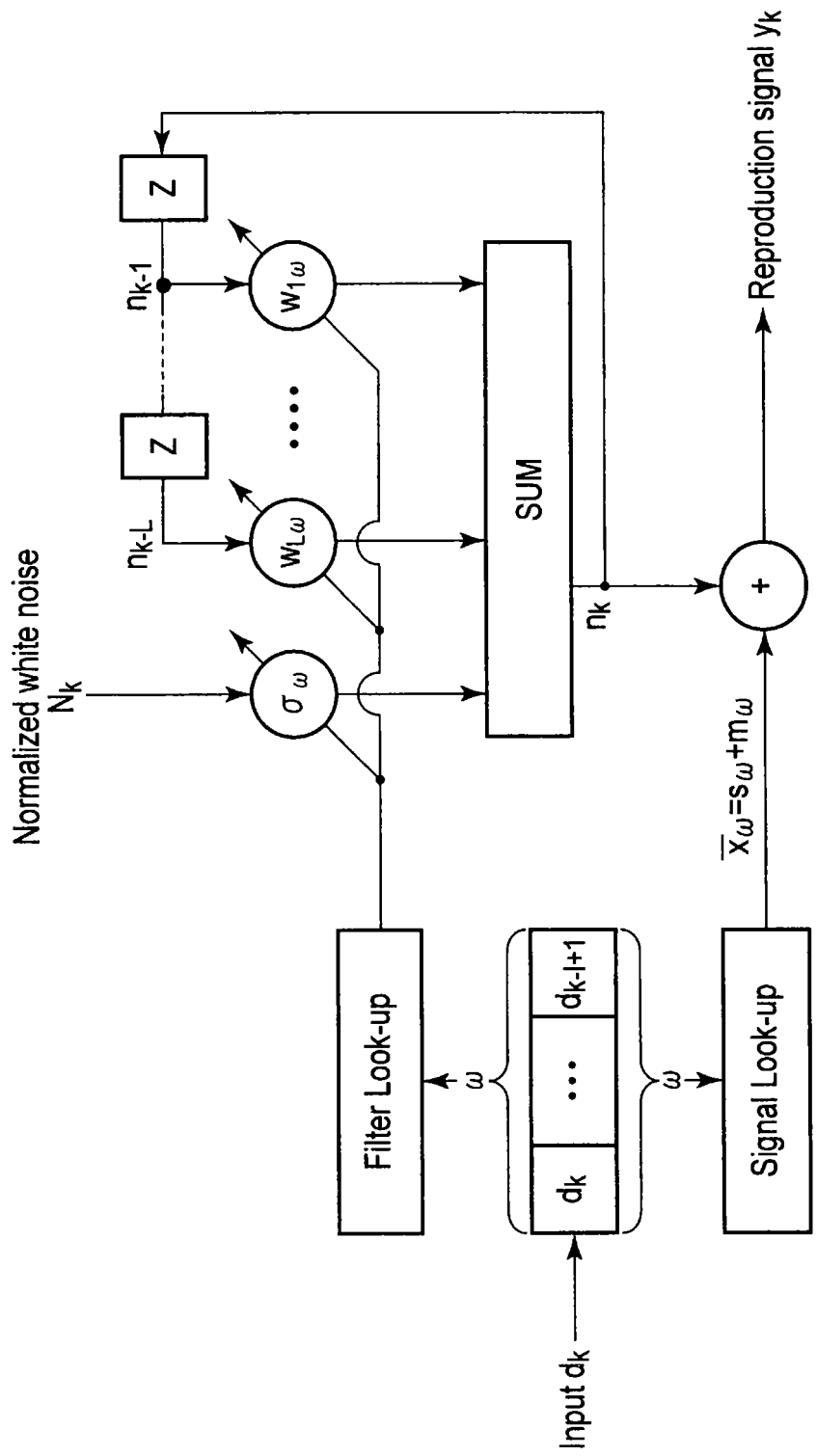
F I G. 4

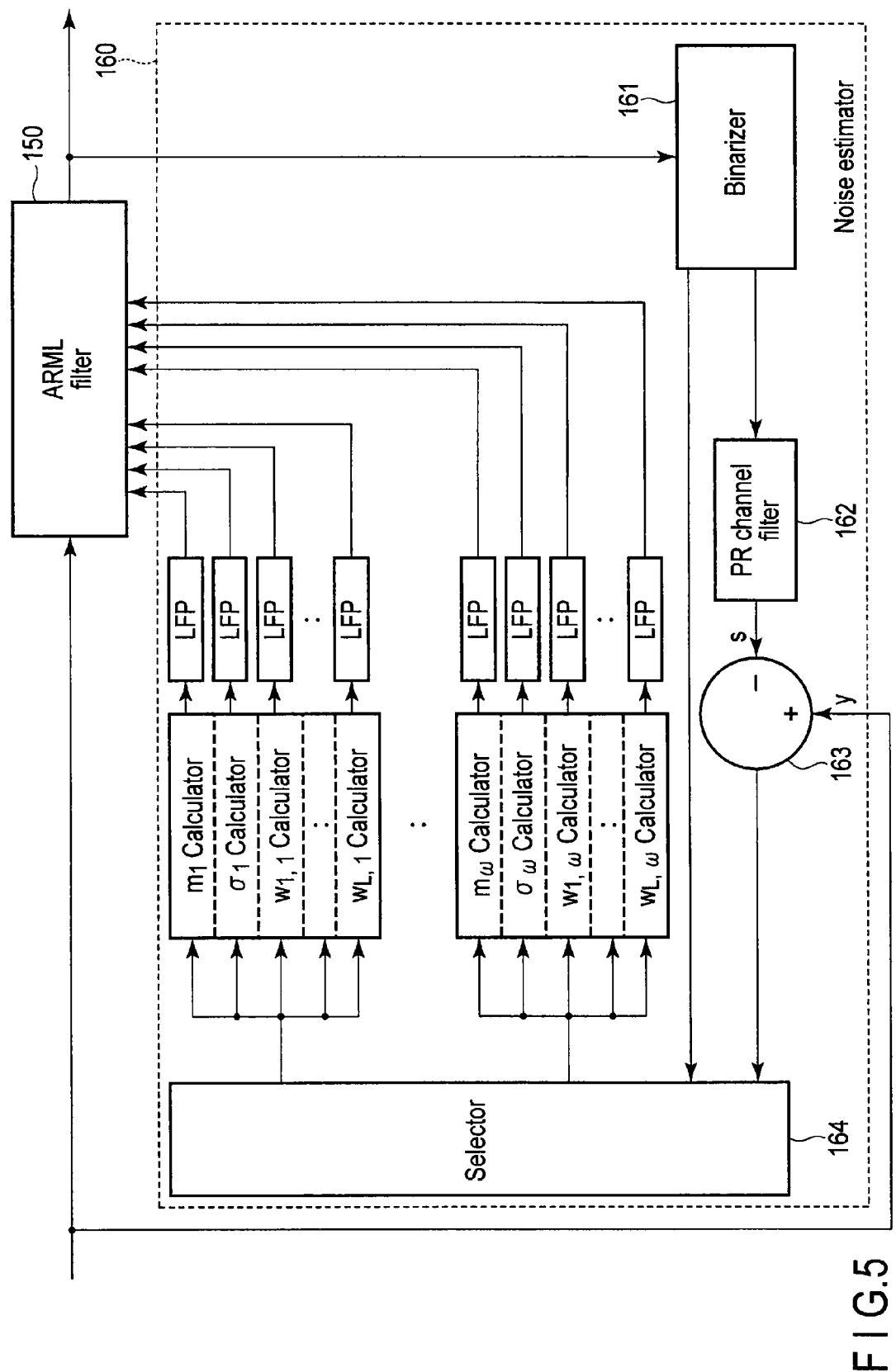
F I G. 5

| Items | Conditions |
|---|---|
| Recording layer type | Write-once medium |
| Channel bit length | 55.87[nm] |
| Track pitch | 0.32[μm] |
| Recording capacity/layer | 33.4GB/layer |
| Reflectance | 2.1% |
| Recording signal modulation scheme | 17 Modulation |

FIG. 6A

| Items | Conditions |
|---|---|
| Objective lens NA | 0.85 |
| Laser wavelength | 405nm |
| Reproduction power | 1.2mW |
| PR class | 12221 |
| Number of taps of Volterra filter(linear) | 13 |
| Number of taps of Volterra filter(quadratic) | 13 x 13 |
| Number of taps of Volterra filter(cubic) | 7 x 7 x 7 |
| Correlation noise length | 2bit |
| Channel bit rate | 132Mbps |

FIG. 6B

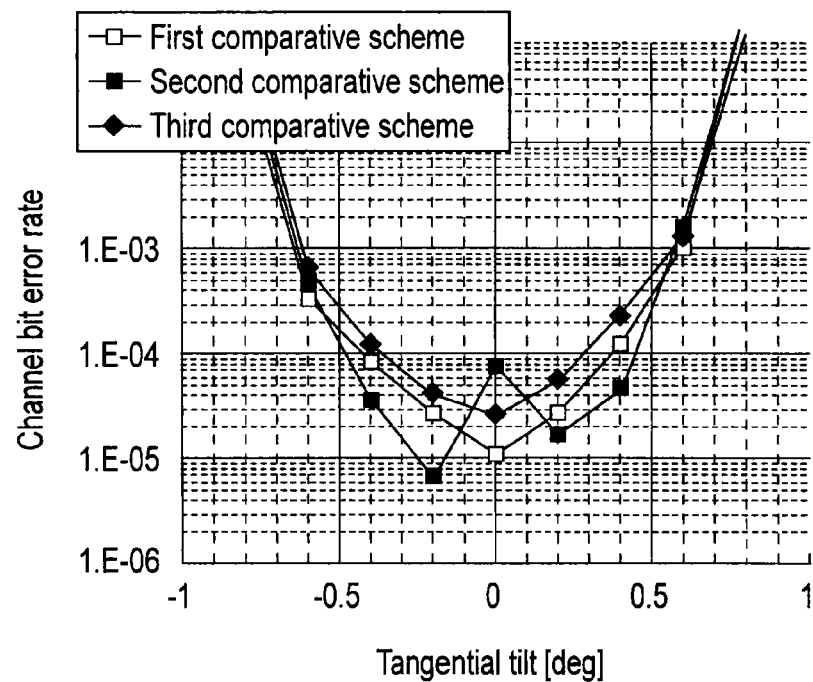
F I G. 8A
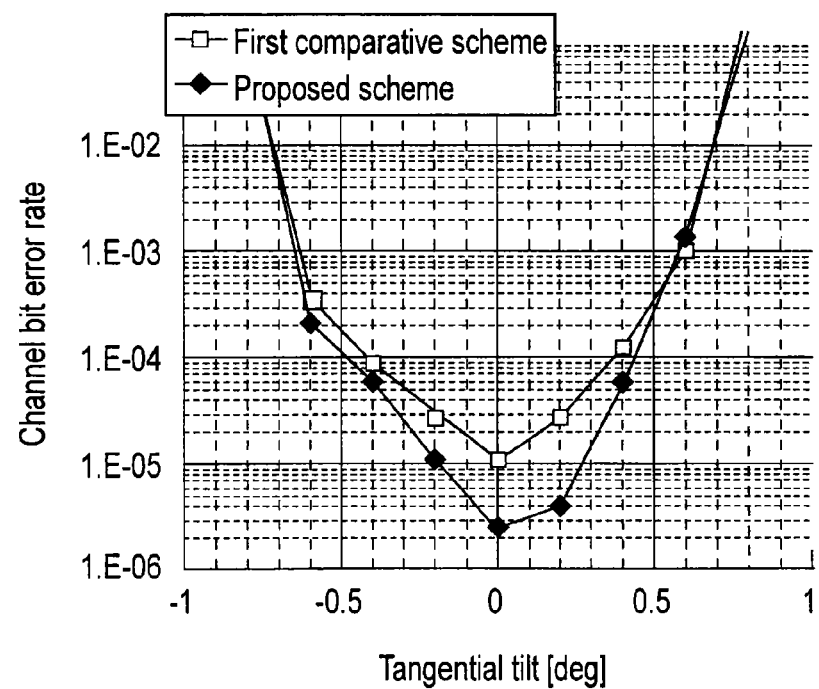
F I G. 8B

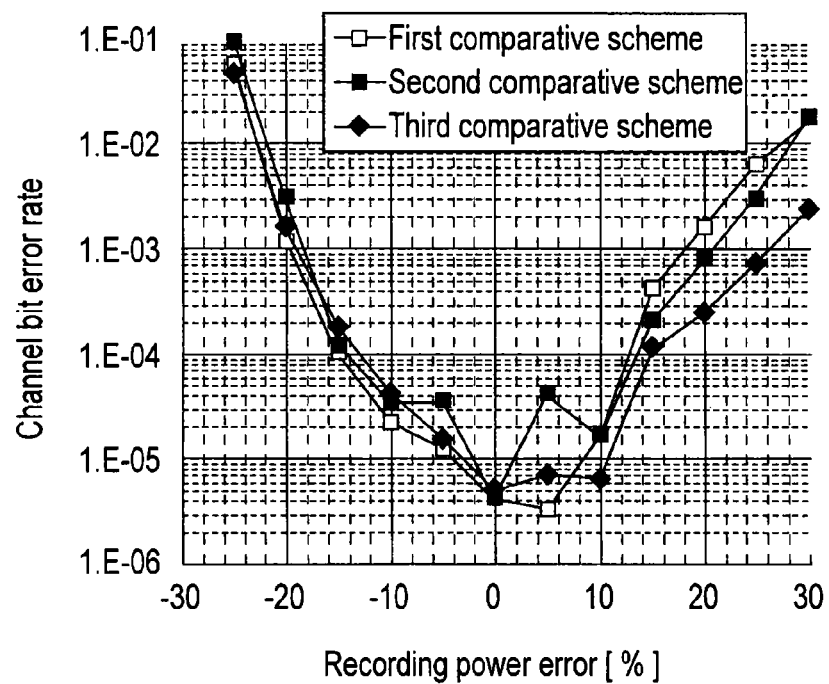
F I G. 10A
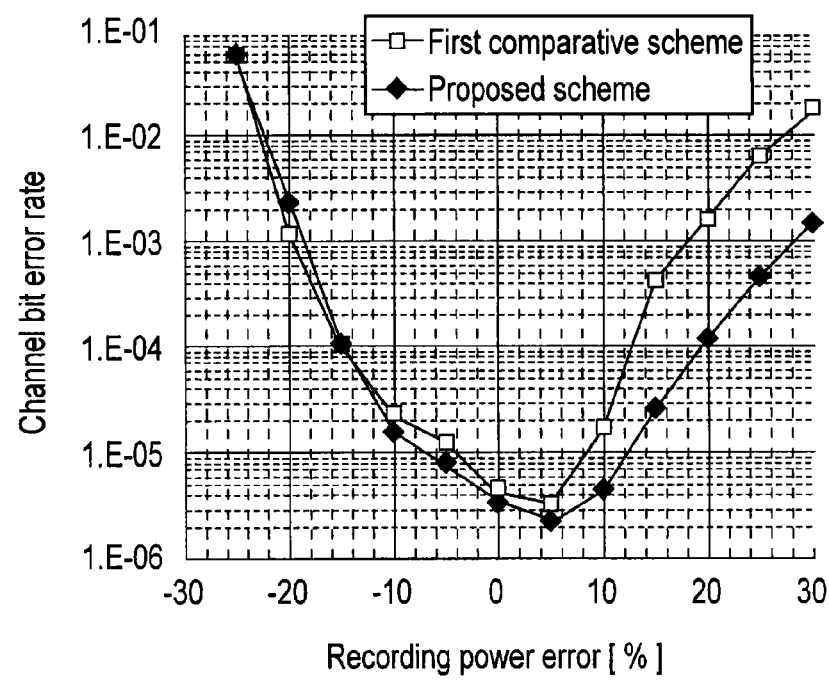
F I G. 10B

|  | Unit | First comparative scheme | Second comparative scheme | Third comparative scheme | Proposed scheme |
|---|---|---|---|---|---|
| Recording power margin | % | 26 | 26 | 25 | 34 |
| Recording pulse width margin | [T] | 0.48 | 0.49 | 0.50 | 0.59 |
| Tilt margin | [deg] | 0.77 | 0.83 | 0.60 | 0.86 |

F I G. 11

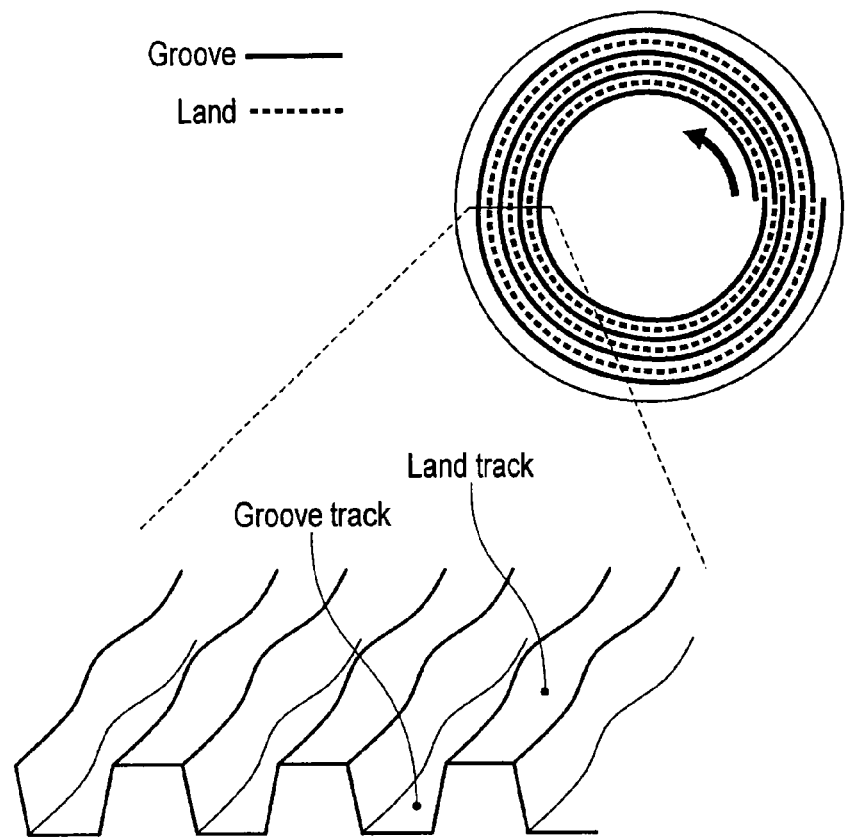
F I G. 14
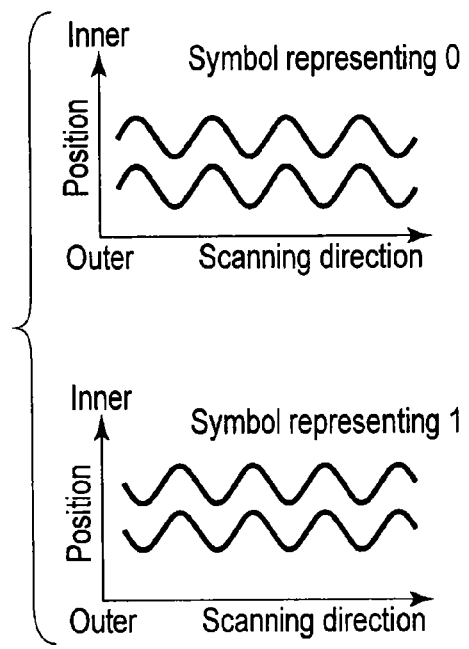
F I G. 15

| | Contents |
|---|---|
| Disk information | Format type |
| | Disk size and maximum transfer rate |
| | Disk structure (number of servo layers, number of information recording layers, and format) |
| | Recording density |
| | Information area layout information |
| | Necessary number of taps of equalizer |
| | Necessary correlation noise length |
| | Adaptive control filter band information |
| | Reproduction power information, recording power information, and recording pulse information |
| | Reserve region |

F I G. 16

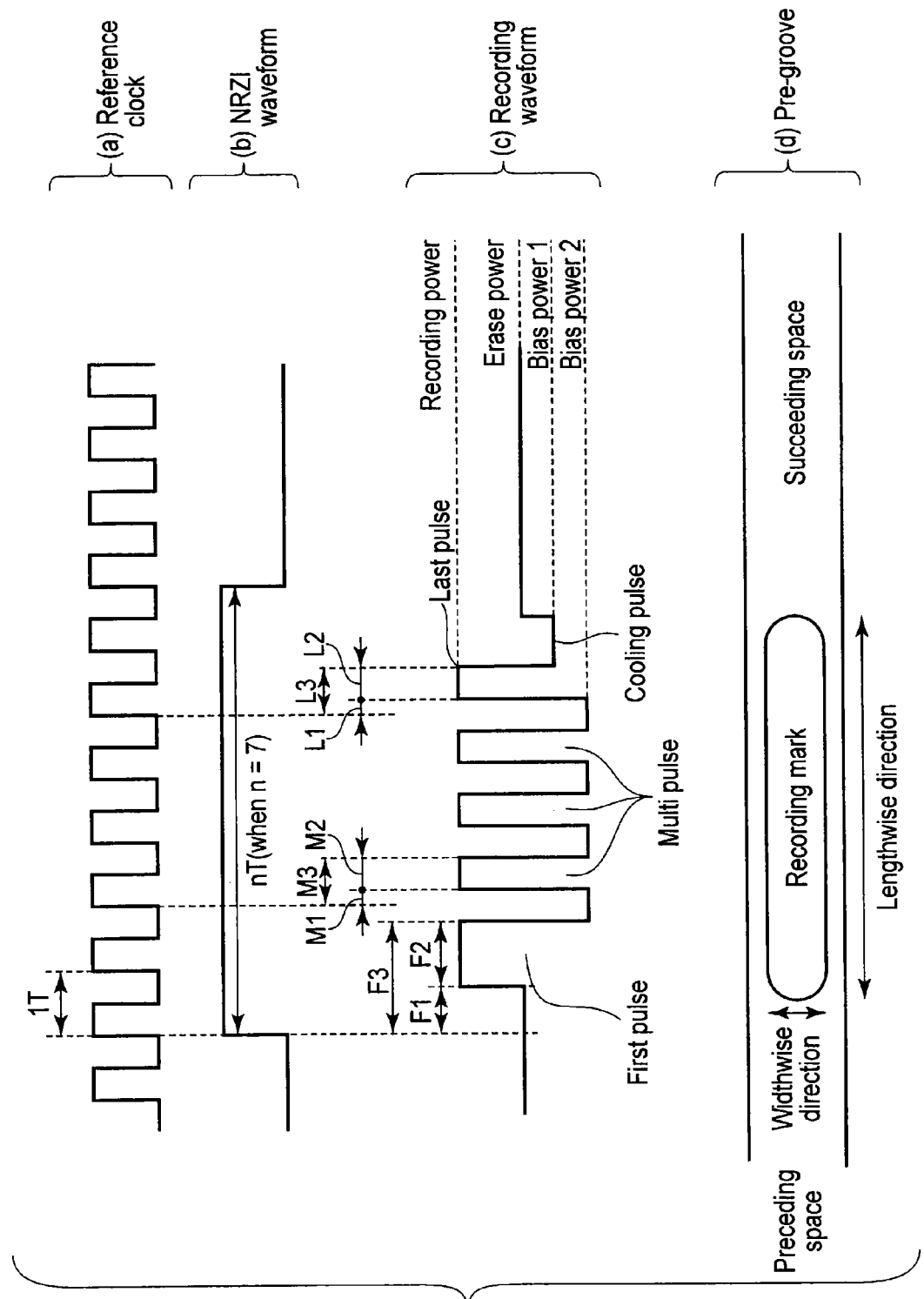
F I G. 18

| Items | Conditions |
|---|---|
| Recording layer type | Write-once medium |
| Servo layer | Two layers |
| Guide structure | Land & groove |
| Recording layer | Five or more layers |
| Channel bit length | 56.28[nm] |
| Track pitch | 0.32[μm] |
| Recording capacity/layer | 32GB/layer |
| Reflectance | 1.0% |
| Recording signal modulation scheme | 17 Modulation |

FIG. 19A

| Items | Conditions |
|---|---|
| Servo layer objective lens NA | 0.6 |
| Servo layer laser wavelength | 660[nm] |
| Servo layer reproduction power | 2.0[mW] |
| Recording layer objective lens NA | 0.85 |
| Recording layer laser wavelength | 405[nm] |
| Recording layer reproduction power | 1.2[mW] |
| PR class | 12221 |
| Number of taps of Volterra filter(linear) | 13 |
| Number of taps of Volterra filter(quadratic) | 13 x 13 |
| Number of taps of Volterra filter(cubic) | 7 x 7 x 7 |
| Correlation noise length | 2bit |
| Channel bit rate | 132Mbps |

FIG. 19B

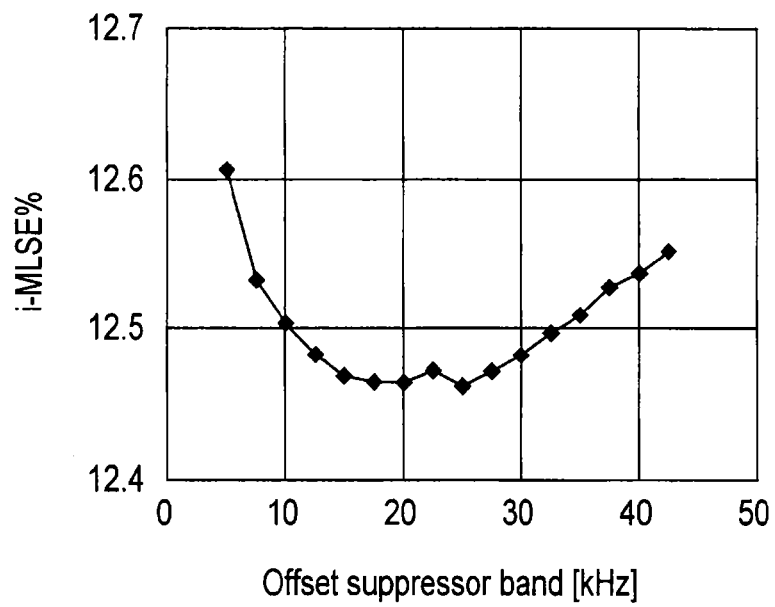
F I G. 20A
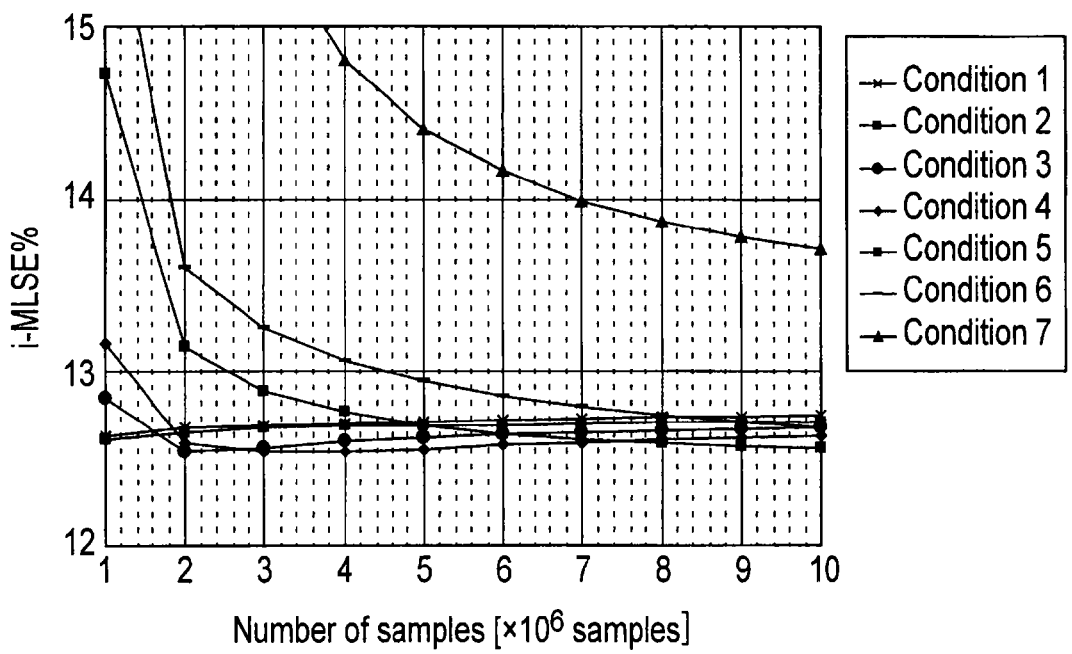
F I G. 20B

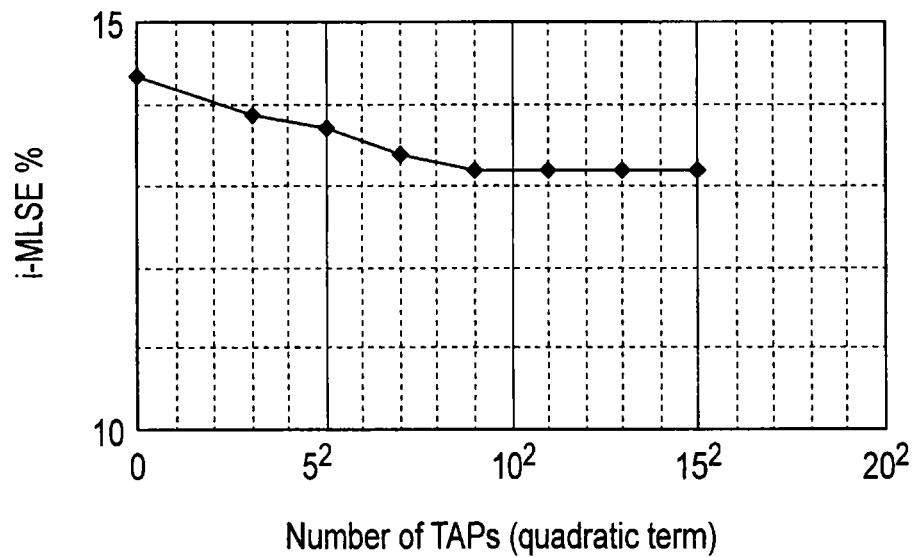
F I G. 21B
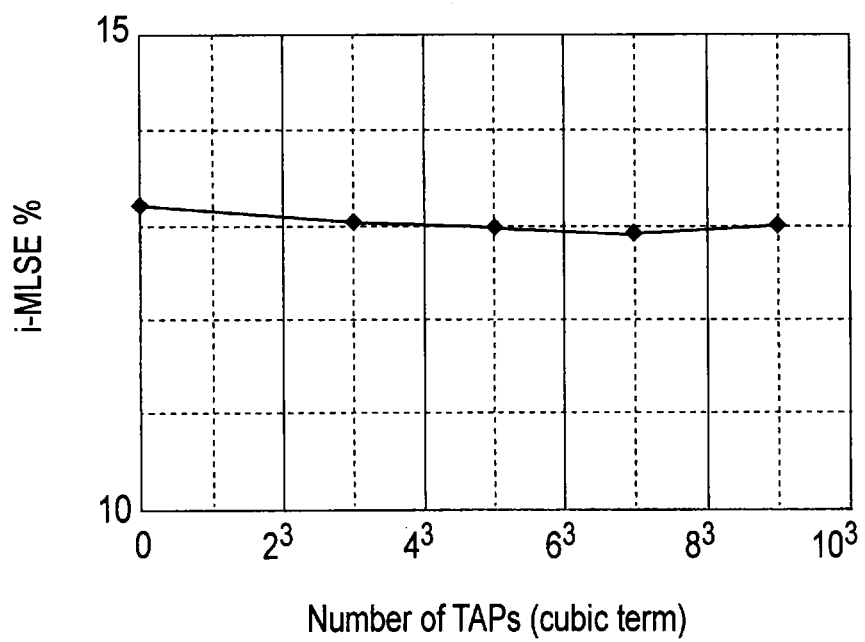
F I G. 21C

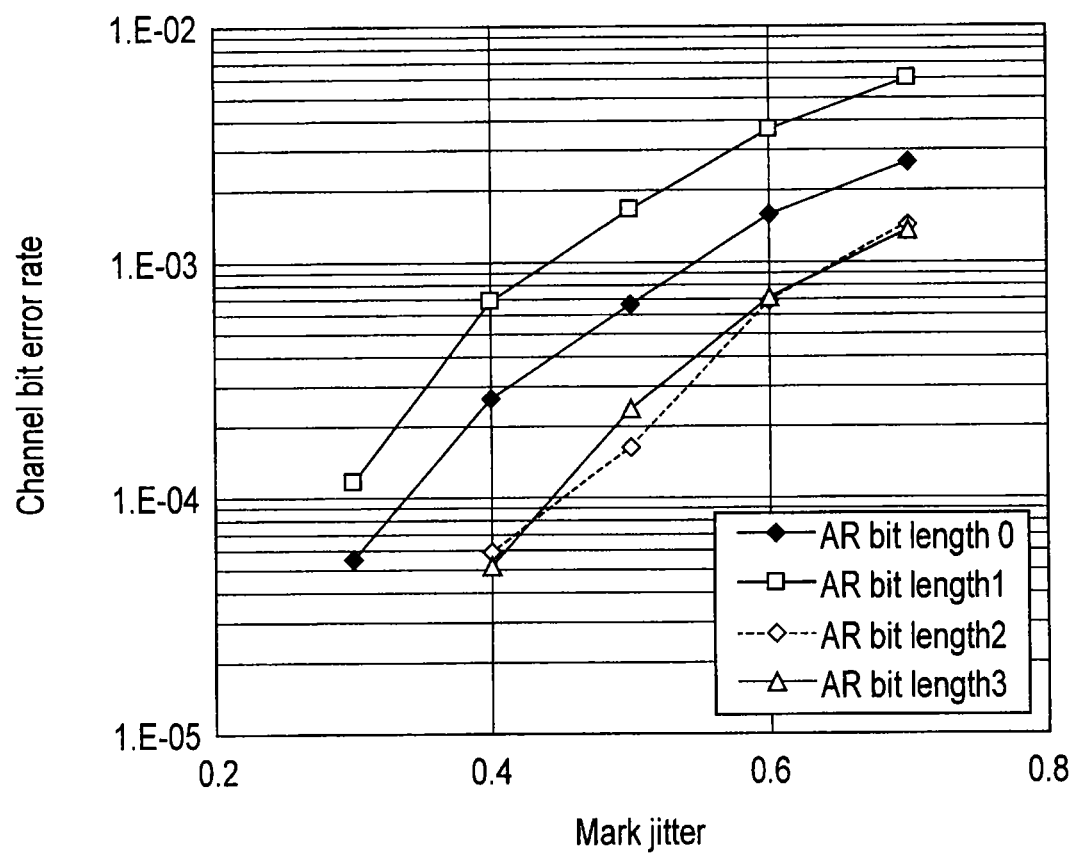
F I G. 22

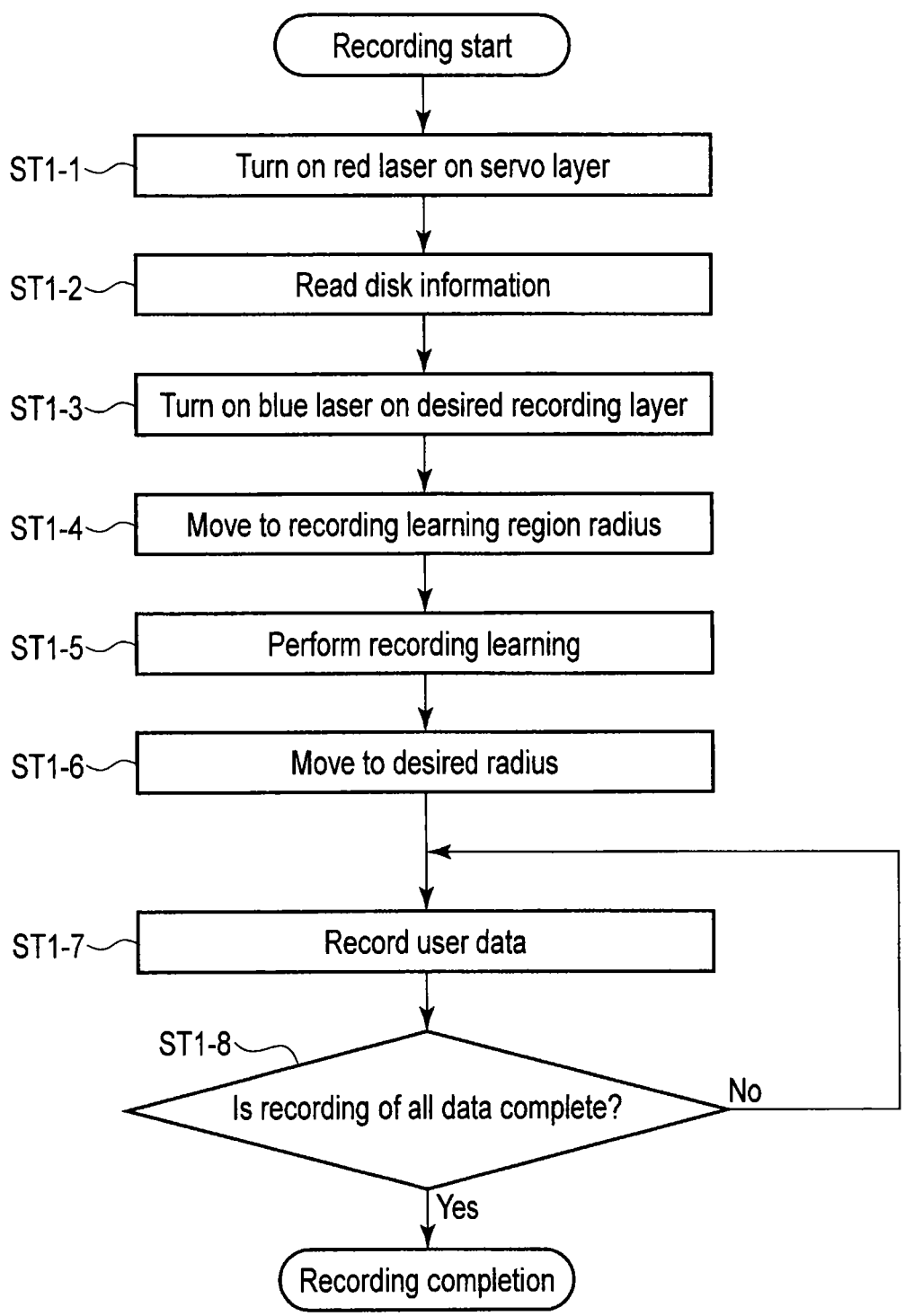
F I G. 23A

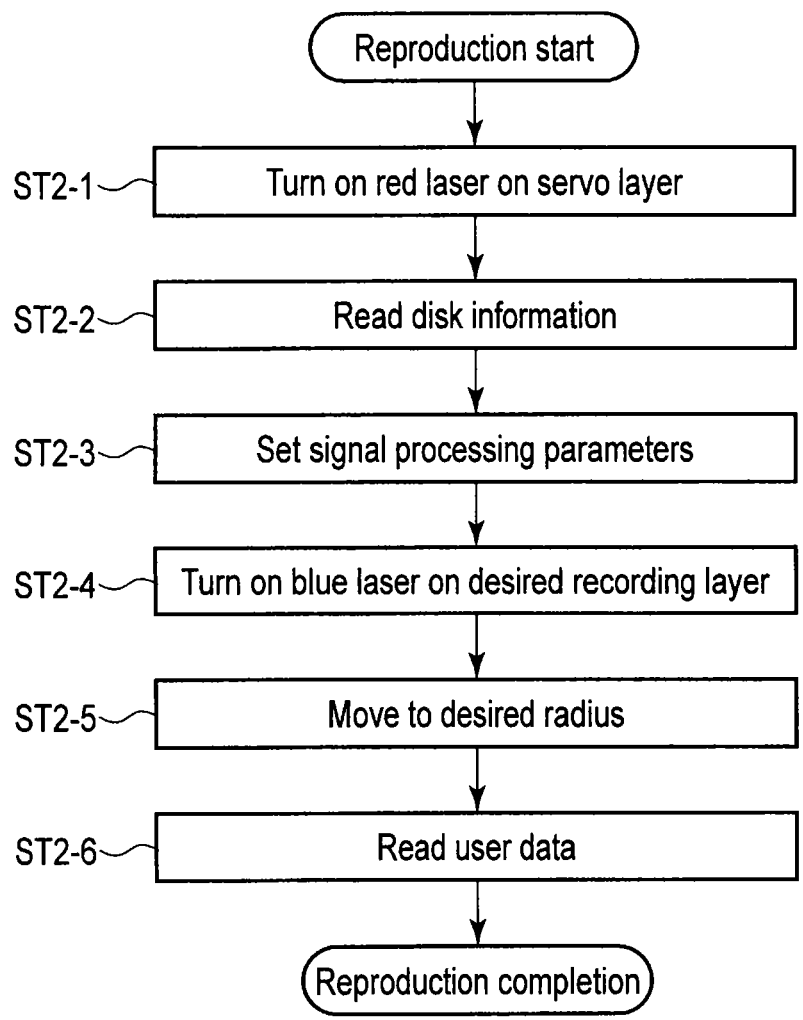
F I G. 23B

US 9,117,485 B2

SIGNAL PROCESSING APPARATUS CAPABLE OF SUPPRESSING NON-LINEAR NOISE COMPONENT DURING READING OPTICAL RECORDING MEDIUM

CROSS-REFERENCE TO RELATED APPLICATIONS

This application is a Continuation application of PCT Application No. PCT/JP2012/056918, filed Mar. 16, 2012, the entire contents of which are incorporated herein by reference.

FIELD

Embodiments described herein relate generally to signal processing for a reproduction signal of an optical recording medium.

BACKGROUND

The volume of data recordable on an optical recording medium generally increases as the density and the number of layers of the medium increase. On the other hand, this makes it difficult to secure accuracy in a recording condition optimization process. Therefore, the amount of nonlinear noise component (e.g., a vertically asymmetrical component) remaining in a reproduction signal from the optical recording medium increases. This nonlinear noise component remaining in the reproduction signal may cause a bit error and disturb the reproduction of user data. An optical recording medium reproduction apparatus typically uses, e.g., an FIR (Finite Impulse Response) filter in order to suppress noise components remaining in a reproduction signal. Since, however, the FIR filter is used to implement a linear equalization process, it is difficult for the FIR filter to sufficiently suppress the nonlinear noise component.

To suppress the nonlinear noise component remaining in a reproduction signal, therefore, it is desired that a nonlinear equalization process be performed on the reproduction signal. Various filters have been proposed to implement this nonlinear equalization process. For example, a neural network filter, Volterra filter, ARML (Auto Regressive Maximum Likelihood) filter, and decision feedback ML filter can implement the nonlinear equalization process.

Unfortunately, a plurality of types of nonlinear noise components are mixed in a reproduction signal from a high-density multilayered optical recording medium. Even when singly using any of the above-mentioned filters, therefore, it is difficult to sufficiently suppress the nonlinear noise components and stably perform adaptive control of the filter.

BRIEF DESCRIPTION OF THE DRAWINGS

FIG. 4 is a view exemplarily showing a noise model to be used by a noise estimator shown in FIG. 1.

FIG. 5 is a block diagram exemplarily showing the noise estimator shown in FIG. 1.

FIG. 6A is a view exemplarily showing the specifications of an optical recording medium readable by the information recording/reproduction apparatus according to the first embodiment.

FIG. 6B is a view exemplarily showing the specifications of the information recording/reproduction apparatus according to the first embodiment.

FIG. 8A is a graph showing a channel bit error rate as a function of a tangential tilt when applying the first, second, and third comparative schemes.

FIG. 8B is a graph showing the channel bit error rate as a function of the tangential tilt when applying the first comparative scheme and proposed scheme.

FIG. 10A is a graph showing the channel bit error rate as a function of a recording power error when applying the first, second, and third comparative schemes.

FIG. 10B is a graph showing the channel bit error rate as a function of the recording power error when applying the first comparative scheme and proposed scheme.

FIG. 11 is a table showing system margins for the tangential tilt, recording pulse width, and recording power when applying the first, second, and third comparative schemes and the proposed scheme.

FIG. 14 is a view exemplarily showing tracks formed in the servo layer of the optical recording medium readable by the information recording/reproduction apparatus according to the second embodiment.

FIG. 15 is a view for explaining wobble modulation.

FIG. 16 is a view exemplarily showing disk information to be recorded in the servo layer of the optical recording medium readable by the information recording/reproduction apparatus according to the second embodiment.

FIG. 18 is a view exemplarily showing recording waveforms to be used by an information processing apparatus according to the second embodiment.

FIG. 19A is a view exemplarily showing the specifications of the optical recording medium readable by the information recording/reproduction apparatus according to the second embodiment.

FIG. 19B is a view exemplarily showing the specifications of the information recording/reproduction apparatus according to the second embodiment.

FIG. 20A is a graph exemplarily showing the performance evaluation of the control bandwidth of an offset suppressor.

FIG. 20B is a graph exemplarily showing the performance evaluation of the control bandwidth of a Volterra filter.

FIG. 21B is a graph exemplarily showing the performance evaluation of the number of taps to be used in a quadratic filter operation by the Volterra filter.

FIG. 21C is a graph exemplarily showing the performance evaluation of the number of taps to be used in a cubic filter operation by the Volterra filter.

FIG. 22 is a graph exemplarily showing the performance evaluation of a noise correlation length to be used in the ARML filter.

FIG. 23A is a flowchart exemplarily showing a data recording process performed by the information recording/reproduction apparatus according to the second embodiment.

FIG. 23B is a flowchart exemplarily showing a data reproduction process performed by the information recording/reproduction apparatus according to the second embodiment.

DETAILED DESCRIPTION

Figure 1:
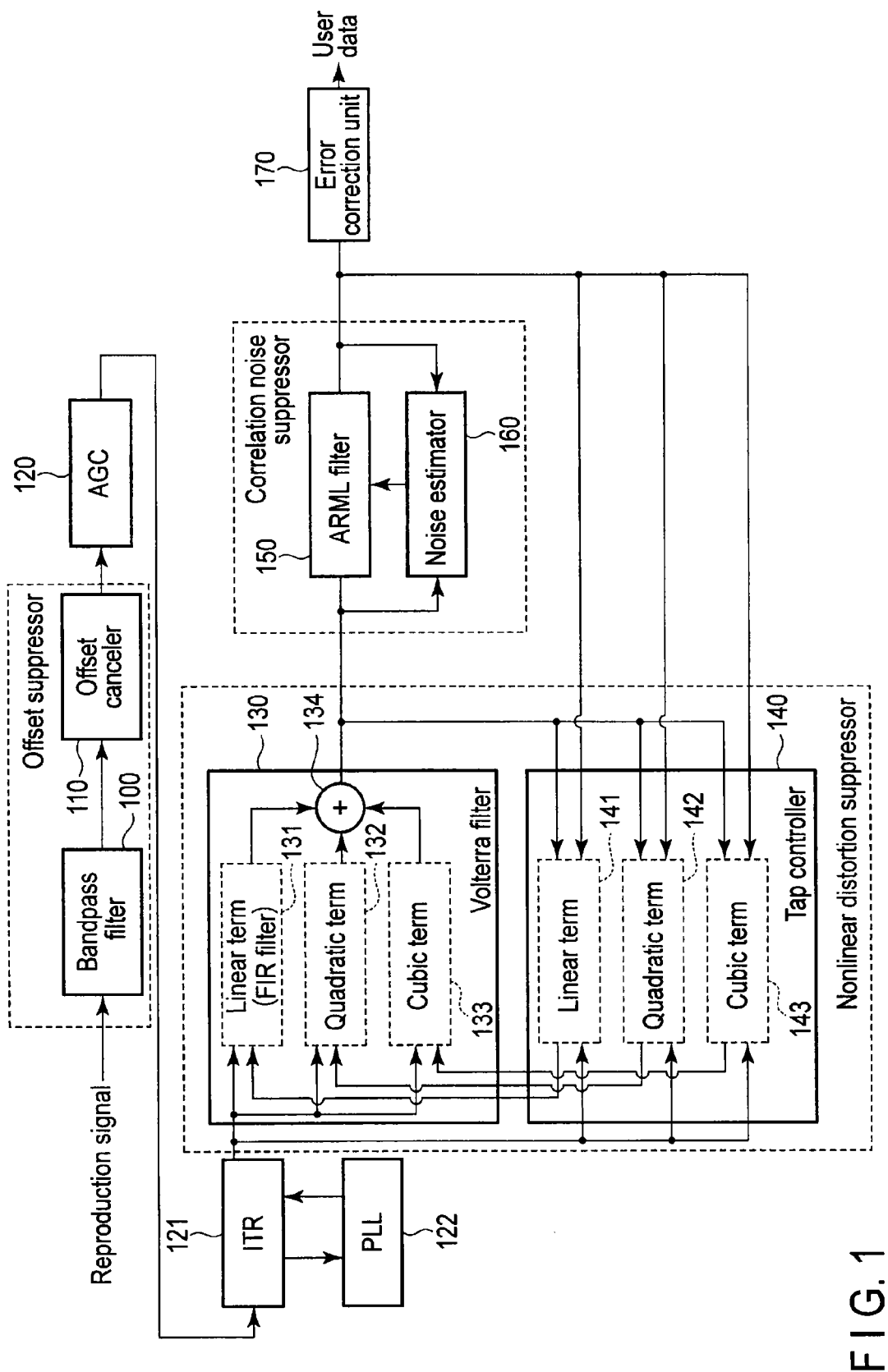
FIG. 1 is a block diagram exemplarily showing a reproduction signal processor of an information recording/reproduction apparatus according to the first embodiment.

The embodiments will be described below with reference to the accompanying drawings.

According to an embodiment, a signal processing apparatus includes a first signal processor, a second signal processor and a third signal processor. The first signal processor suppresses an offset component remaining in a reproduction signal read from an optical recording medium to obtain a first signal. The second signal processor suppresses a nonlinear distortion component remaining in the first signal to obtain a second signal. The third signal processor suppresses a correlation noise component remaining in the second signal to obtain a third signal.

Note that in the following description, the same or similar reference numerals denote elements which are the same as or similar to previously explained elements, and a repetitive explanation thereof will basically be omitted.

First Embodiment

An information recording/reproduction apparatus according to the first embodiment can process a reproduction signal read from an optical recording medium. The information recording/reproduction apparatus according to this embodiment can include a reproduction signal processor shown in FIG. 1 in order to process the reproduction signal.

This reproduction signal processor shown in FIG. 1 effectively suppresses nonlinear noise components remaining in the reproduction signal from the optical recording medium. More specifically, the reproduction signal processor performs an offset component suppression process, nonlinear distortion component suppression process, and correlation noise component suppression process in order.

As shown in FIG. 1, the reproduction signal processor includes a bandpass filter 100, offset canceler 110, AGC (Auto Gain Controller) 120, ITR (Interpolated Timing Recovery) 121, PLL (Phase Locked Loop) 122, Volterra filter 130, tap controller 140, ARML filter 150, noise estimator 160, and error correction unit 170.

The bandpass filter 100 and offset canceler 110 function as an offset suppressor. The Volterra filter 130 and tap controller 140 function as a nonlinear distortion suppressor. The ARML filter 150 and noise estimator 160 function as a correlation noise suppressor. Also, the ITR 121 and PLL 122 function as a synchronizer.

The offset suppressor suppresses an offset component remaining in an input signal by performing signal processing which makes the central level of the input signal close to zero.

The bandpass filter 100 receives a reproduction signal read from an optical recording medium (not shown). Of the input reproduction signal, the bandpass filter 100 passes signal components within a desired band, and suppresses signal components outside the band. The bandpass filter 100 outputs the filtered signal to the offset canceler 110. The bandpass filter 100 can be implemented by using an IIR (Infinite Impulse Response) filter or FIR filter. The bandpass filter 100 may also be replaced with a high-pass filter.

The offset canceler 110 receives the signal from the bandpass filter 100. The offset canceler 110 suppresses an offset component remaining in the input signal, and outputs the offset-suppressed signal to the AGC 120. More specifically, the offset canceler 110 can suppress an offset component of an input signal by subtracting a DC component of the input signal from it.

Figure 2:
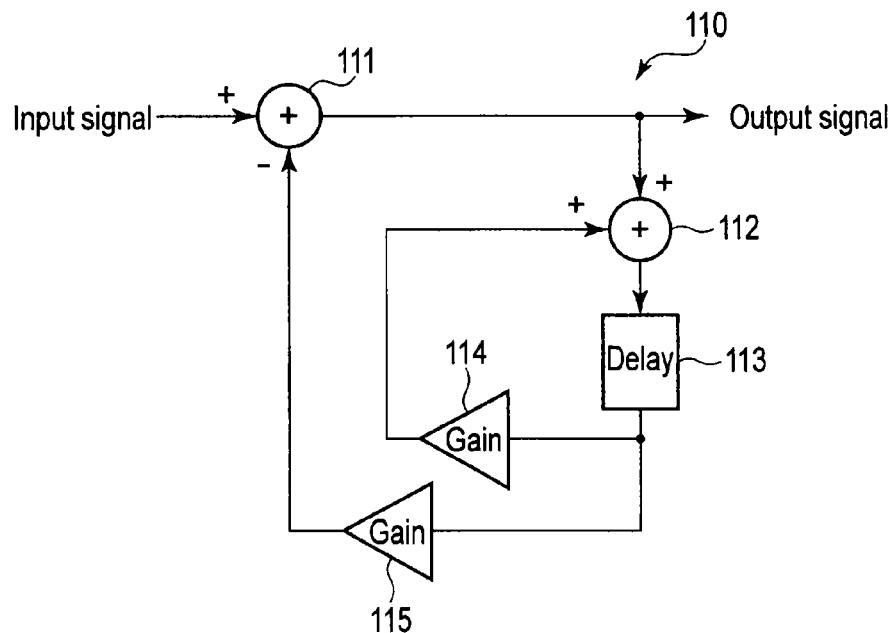
FIG. 2 is a view exemplarily showing an offset suppressor shown in FIG. 1.

As shown in, e.g., FIG. 2, the offset canceler 110 includes a subtracter 111, an adder 112, a delay device 113, and amplifiers 114 and 115. The control bandwidth of the offset canceler 110 shown in FIG. 2 can be adjusted by the gains of the amplifiers 114 and 115.

The subtracter 111 obtains an output signal by subtracting a signal fed back from the amplifier 115 from the input signal. The adder 112 adds the output signal from the subtracter 111 and a signal fed back from the amplifier 114, and outputs the obtained signal to the delay device 113.

The delay device 113 receives the signal from the adder 112, and delays the signal. The delay device 113 outputs the delayed signal to the amplifiers 114 and 115. The amplifier 114 receives the delayed signal from the delay device 113, adjusts the amplitude in accordance with the gain, and feeds back the signal to the adder 112. The amplifier 115 receives the delayed signal from the delay device 113, adjusts the amplitude in accordance with the gain, and feeds back the signal to the subtracter 111.

The AGC 120 receives the offset-suppressed signal from the offset suppressor. The AGC 120 automatically adjusts the amplitude of the input signal so that the amplitude becomes close to a desired value. The AGC 120 outputs the amplitude-adjusted signal to the synchronizer.

The synchronizer receives the amplitude-adjusted signal from the AGC 120. The synchronizer adjusts a temporal fluctuation of the frequency of the input signal. The synchronizer outputs the synchronized signal to the nonlinear distortion suppressor.

The Volterra filter 130 of the nonlinear distortion suppressor suppresses a nonlinear distortion component (e.g., the vertical asymmetry of a waveform) remaining in the input signal. In addition, the tap controller 140 of the nonlinear distortion suppressor dynamically updates the tap coefficient of the Volterra filter 130. Therefore, even when the nonlinear distortion component remaining in the input signal temporally fluctuates, the nonlinear distortion suppressor can stably suppress the nonlinear distortion component. As described previously, the nonlinear distortion suppressor receives the offset-suppressed signal. This makes it possible to prevent a situation in which a waveform shift caused by the offset component is suppressed as a vertically asymmetrical component by mistake. It is also possible to stably perform adaptive control on the Volterra filter 130 of the nonlinear distortion suppressor by setting the control bandwidth of the Volterra filter 130 lower than that of the offset suppressor.

The Volterra filter 130 receives the synchronized signal from the synchronizer. The Volterra filter 130 performs a Volterra filtering process on the input signal, and outputs the filtered signal to the tap controller 140 and correlation noise suppressor. As shown in, e.g., FIG. 1, the Volterra filter 130 can include a filter operation unit 131 for the linear term, a filter operation unit 132 for the quadratic term, and a filter operation unit 133 for the cubic term. That is, the Volterra filter 130 shown in FIG. 1 can perform a cubic filtering process. More specifically, the Volterra filter 130 can perform a filtering process indicated by:

$$y(t) = \sum_{i}^{I-1} h_1(t, i) \cdot x(t-i) + \sum_{j=0}^{J-1}\sum_{k=0}^{K-1} h_2(t', j, k) \cdot x(t'-j) \cdot x(t'-k) + \sum_{f=0}^{F-1}\sum_{g=0}^{G-1}\sum_{h=0}^{H-1} h_3(t'', f, g, h) \cdot x(t''-f) \cdot x(t''-g) \cdot x(t''-h) \quad (1)$$

wherein the first term of the right-hand side represents a first degree filter operation (i.e., a linear filter operation), the second term of the right-hand side represents a quadratic filter operation, and the third term of the right-hand side represents a cubic filter operation. According to equation (1), the linear filter operation is equivalent to a normal FIR filtering process. The filtering process of equation (1) can suppress higher-degree distortion components in addition to a quadratic distortion component (e.g., the vertical asymmetry of a waveform).

In equation (1), x(t) represents an input signal to the Volterra filter 130, and y(t) represents an output signal from the Volterra filter 130. Also, $h_1$ represents a tap coefficient for the linear filter operation, $h_2$ represents a tap coefficient for the quadratic filter operation, and $h_3$ represents a tap coefficient for the cubic filter operation. t represents a sampling timing. t' and t'' represent sampling timings at which delays for the quadratic and cubic filter operations are compensated for. i is a variable which specifies a tap number in the linear filter operation, and I represents a tap length in the linear filter operation. j and k are variables which specify tap numbers in the quadratic filter operation, and J and K represent tap lengths in the quadratic filter operation. Note that J and K may have the same value or different values. f, g, and h are variables which specify tap numbers in the cubic filter operation, and F, G, and H represent tap lengths in the cubic filter operation. F, G, and H may have the same value or different values. Note that the tap coefficients (=$h_1$, $h_2$, and $h_3$) to be used by the Volterra filter 130 are dynamically updated by the tap controller 140.

The tap controller 140 updates the tap coefficients to be used by the Volterra filter 130. The tap controller 140 sequentially outputs the updated tap coefficients to the Volterra filter 130. As shown in, e.g., FIG. 1, the tap controller 140 can include a tap coefficient calculator 141 for the linear filter operation, a tap coefficient calculator 142 for the quadratic filter operation, and a tap coefficient calculator 143 for the cubic filter operation. More specifically, the tap controller 140 updates the tap coefficients in accordance with:

$h_1(t+1,i) = h_1(t,i) + \mu_1 \cdot e(t) \cdot x(t-i)$ $h_2(t'+1,j,k) = h_2(t',j,k) + \mu_2 \cdot e(t') \cdot x(t'-j) \cdot x(t'-k)$ $h_3(t''+1,f,g,h) = h_3(t'',f,g,h) + \mu_3 \cdot e(t'') \cdot x(t''-f) \cdot x(t''-g) \cdot x(t''-h)$ (2)

where $\mu_1$ represents a step size parameter for the linear filter operation, $\mu_2$ represents a step size parameter for the quadratic filter operation, and $\mu_3$ represents a step size parameter for the cubic filter operation. Note that the control bandwidth of the Volterra filter 130 can be adjusted by the step size parameters.

In equation (2), e(t)=d(t)−y(t), and d(t) represents an ideal signal level calculated based on a decoding result and a PR (Partial Response) class. Equation (2) is based on the LMS (Least Mean Square) method. However, the tap controller 140 may also update the tap coefficients based on a method other than the LMS.

The noise estimator 160 of the correlation noise suppressor estimates a correlation noise component remaining in an input signal based on an AR (Auto-Regressive) model. The ARML filter 150 of the correlation noise suppressor suppresses the correlation noise component remaining in the input signal.

As will be described later, the noise estimator 160 is based on the assumption that white noise mixed in an input signal in the past is converted into a correlation noise component and added to an input signal. Therefore, if a nonlinear distortion component as colored noise is not sufficiently suppressed in an input signal, the correlation noise component estimation accuracy of the noise estimator 160 may deteriorate, and as a consequence the ARML filter 150 may not effectively function. However, the correlation noise suppressor receives a signal in which a nonlinear distortion is suppressed. Accordingly, it is possible to prevent a situation in which the nonlinear distortion component exerts a bad influence on the estimation of the correlation noise component.

Also, it is possible to stably perform adaptive control on the ARML filter 150 of the correlation noise suppressor by setting the control bandwidth of the ARML filter 150 lower than that of the Volterra filter 130 of the nonlinear distortion suppressor.

The ARML filter 150 is an ML filter capable of effectively suppressing correlation noise expressed by an AR model. In the AR model, autocorrelation of noise is assumed. More specifically, the ARML filter 150 performs equalization not on linear white noise but on colored noise which changes in intensity for each pattern of an input signal and has a temporal correlation. Therefore, even when a noise component having a pattern dependence or a noise component having a temporal correlation remains in an input signal, the ARML filter 150 can effectively suppress the noise component.

The ML filter is implemented based on, e.g., a Viterbi algorithm, BCJR (Bahl-Cocke-Jelinek-Raviv) algorithm, MLM (Max-Log-Map) algorithm, or SOVA (Soft Output Viterbi Algorithm). For example, when an error correction process (e.g., a Reed Solomon code decoding process) is performed on a hard decision result (i.e., binary data of 1 or 0) in the output stage of the ML filter, the ML filter is configured based on an algorithm (e.g., Viterbi equalization algorithm) which outputs a hard decision result. On the other hand, when an error correction process (e.g., an LDPC (Low Density Parity Check) code decoding process) is performed on a soft decision result in the output stage of the ML filter, the ML filter is configured based on an algorithm (e.g., a BCJR algorithm, MLM algorithm, or SOVA algorithm) which outputs a soft decision result.

The ARML filter 150 calculates a likelihood index called a metric for each branch, and decides a most likely path based on the metric, thereby obtaining a hard decision result or soft decision result of a reproduction signal. The ARML filter 150 outputs the hard decision result or soft decision result of the reproduction signal to the noise estimator 160 and error correction unit 170.

Figure 3:
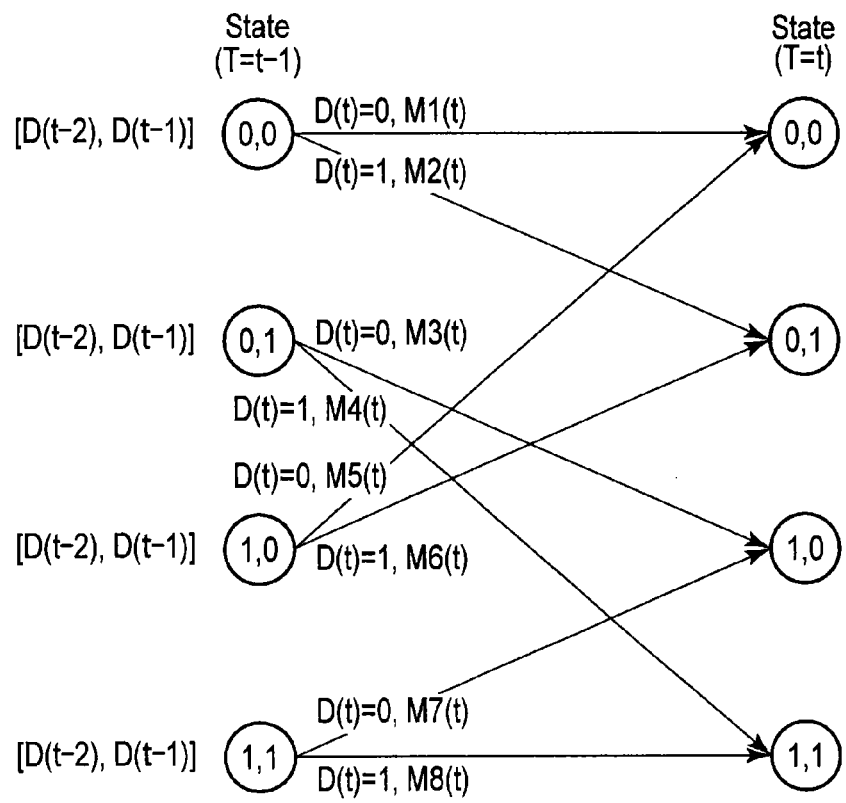
FIG. 3 is a trellis diagram for explaining the operation of an ARML filter shown in FIG. 1.

The "branch" herein mentioned means a transition from a state at a given time to a state at the next time, and an ideal signal can be derived for each branch. The "path" is obtained by connecting one or more branches passed until the state at a given time. As shown in, e.g., FIG. 3, the "state" is defined for each data pattern which can be produced at a given time and an immediately preceding time. For state=(0,0), for example, branch M1 to state=(0,0) and branch M2 to state= (0,1) exist. Similarly, for state (1,1), branch M7 to state (1,0) and branch M8 for state (1,1) exist. According to, e.g., the Viterbi algorithm, the metrics of branches forming paths are accumulated, and a path having the smallest metric accumulated value is evaluated as most likely.

For example, the metric in the ML filter can be calculated in accordance with:

$$M\omega = \log(PD_{NORM}(\omega)) = \ln\sigma^2 + \frac{(s_\omega + m_\omega - y_k)^2}{\sigma^2} \quad (3)$$

where $\omega$ represents a variable which specifies a branch. That is, $M\omega$ is the metric of branch=$\omega$. According to equation (3), the metric is obtained by converting probability density function=$PD_{Norm}\omega$ corresponding to a branch into a logarithm. This probability density function can be calculated based on white noise standard deviation=$\sigma$, ideal signal=$s_\omega$ corresponding to branch=$\omega$, offset error=$m_\omega$ from the ideal signal, and input signal=$y$.

On the other hand, the ARML filter 150 can calculate the metric in accordance with:

$$M[AR]\omega = \quad (4)$$

$$\ln\sigma_\omega^2 + \frac{\left\{(s_{\omega,k} + m_\omega - y_k) - \sum_{l=1}^{L} w_{l\omega}(s_{\omega,k-1} + m_{\omega,k-1} - y_{k-1})\right\}^2}{\sigma_\omega^2}$$

where $M[AR]\omega$ represents the metric of branch=$\omega$, L represents a noise correlation length, and $w_\omega$ represents a correlation coefficient set of noise corresponding to branch=$\omega$. According to equation (4), the ARML filter 150 can calculate the metric based on white noise standard deviation=$\sigma_\omega$, corresponding to branch=$\omega$, ideal signal=$s_\omega$ corresponding to branch=$\omega$, offset error=$m_\omega$ from the ideal signal, input signal=$y$, and noise correlation coefficient set=$w_\omega$. Note that the offset error, white noise standard deviation, and noise correlation coefficient set are estimated by the noise estimator 160.

The noise estimator 160 estimates the offset error $m_\omega$, white noise standard deviation $\sigma_\omega$, and noise correlation coefficient set $w_\omega$ for each branch=$\omega$, based on the noise model exemplarily shown in FIG. 4. More specifically, based on the assumption that reproduction signal=$y_k$ is obtained because noise generated in accordance with the noise model shown in FIG. 4 is mixed in input signal=$d_k$, the noise estimator 160 estimates the offset error, white noise standard deviation, and noise correlation coefficient set. According to the noise model shown in FIG. 4, offset errors $m_\omega$, each of which differs for each ideal signal=$s_\omega$ corresponding to branch=$\omega$, are added. Also, according to the noise model shown in FIG. 4, noise having a correlation is generated between samples from white noise as the origin. That is, white noise mixed in the past is converted into correlation noise by noise correlation coefficient set=$w_\omega$, which differs for each branch=$\omega$, and is then added to an input signal.

According to the noise model shown in FIG. 4, it is possible to mathematically calculate the offset error $m_\omega$, white noise standard deviation $\sigma_\omega$, and noise correlation coefficient set $w_\omega$ based on reproduction signal $y_k$ and ideal signal=$s_\omega$. The noise estimator 160 receives the output signal (i.e., the signal filtered by the Volterra filter 130) from the nonlinear distortion suppressor as above-mentioned reproduction signal=$y_k$, and uses a signal obtained by performing PR channel equalization on the output signal from the ARML filter 150 as above-mentioned ideal signal=$s_\omega$.

For example, as shown in FIG. 5, the noise estimator 160 includes a binarizer 161, a PR channel filter 162, a subtracter 163, a selector 164, and a calculator set for each branch=$\omega$.

The binarizer 161 binarizes the output signal from the ARML filter 150, and outputs the binary signal to the PR channel filter 162. Note that the binarizer 161 is unnecessary if the ARML filter 150 outputs a binary signal (i.e., a hard decision result).

The PR channel filter 162 receives the binary signal from the binarizer 161 (or ARML filter 150). The PR channel filter 162 generates an ideal signal by performing a filtering process corresponding to the PR class on the binary signal. For example, when the PR class adopted in the signal processing is 12221, the PR channel filter 162 can be implemented by an FIR filter using a tap coefficient [1,2,2,2,1]. The PR channel filter 162 outputs the ideal signal to the subtracter 163.

The subtracter 163 receives the output signal from the nonlinear noise suppressor as a reproduction signal, and receives the ideal signal from the PR channel filter 162. The subtracter 163 subtracts the ideal signal from the reproduction signal, and outputs a difference signal (i.e., a noise component) to the selector 164.

The selector 164 refers to branch=$\omega$ determined by the ARML filter 150, and outputs the difference signal from the subtracter 163 to a calculator set corresponding to the branch. The calculator set given the difference signal calculates the offset error $m_\omega$, white noise standard deviation $\sigma_\omega$, and noise correlation coefficient set $w_\omega$ corresponding to branch=$\omega$, based on the noise model shown in FIG. 4. The calculated offset error $m_\omega$, white noise standard deviation $\sigma_\omega$, and noise correlation coefficient set $w_\omega$ are output to an internal metric calculation unit (not shown) of the ARML filter 150 via a low-pass filter (LPF).

Note that the noise estimator 160 can adjust the control bandwidth of the ARML filter 150 by, e.g., the bands of the LPFs, and the number of samples of an input signal to be referred to in order to calculate the noise parameters (i.e., the calculated offset error $m_\omega$, white noise standard deviation $\sigma_\omega$, and noise correlation coefficient set $w_\omega$). Also, the noise estimator 160 may sequentially update the noise parameters as exemplarily shown in FIG. 5, and may update the noise parameters by a different way. More specifically, the noise estimator 160 may calculate the initial values of the noise parameters by using a part of an input signal as a training part, and continuously use the initial values until the next update timing. In this case, the noise estimator 160 can adjust the control bandwidth of the ARML filter 150 by the period of the update timings.

The error correction unit 170 receives the hard decision result or soft decision result of the reproduction signal from the ARML filter 150. The error correction unit 170 performs a deinterleaving process corresponding to an interleaving process performed during data recording. Then, the error correction unit 170 obtains reproduction data by performing error correction decoding corresponding to error correction encoding (e.g., Reed-Solomon coding or LDPC coding) performed during data recording. This reproduction data obtained by the error correction unit 170 is output outside.

The information recording/reproduction apparatus according to this embodiment can reproduce data from an optical recording medium satisfying, e.g., specifications shown in FIG. 6A. According to the specifications shown in FIG. 6A, the information recording layer type is a write-once type, the channel bit length is 55.87 [nm], and the track pitch is 0.32 [μm]. The data recording capacity of each information recording layer is 33.4 GB, the reflectance of each information recording layer is about 2%, and data is recorded as it is modulated by the 17 modulation scheme.

On the other hand, the information recording/reproduction apparatus according to this embodiment satisfies, e.g., specifications shown in FIG. 6B. According to the specifications shown in FIG. 6B, the NA of an objective lens is 0.85, the wavelength of a laser used in data recording/reproduction is 405 [nm], and the reproduction power is 1.2 [mW]. The PR class used in the signal processing is 12221, and the channel bit rate is 132 Mbps. The degree of the Volterra filter 130 is 3, the number of taps of the linear filter operation is 13, the number of taps of the quadratic filter operation is 13×13, and the number of taps of the cubic filter operation is 7×7×7. In the ARML filter 150, the correlation noise length (=L) is set at 2 bits.

The effect of the information recording/reproduction apparatus according to this embodiment will be explained below with reference to the results of an experiment. Note that an optical recording medium used in this experiment satisfies the specifications shown in FIG. 6A.

In this experiment, a comparative scheme (to be referred to as a first comparative scheme for the sake of convenience) for this embodiment was prepared. An information recording/reproduction apparatus according to the first comparative scheme includes a reproduction signal processor shown in FIG. 7. This reproduction signal processor shown in FIG. 7 includes a bandpass filter 201, offset canceler 202, AGC 203, ITR 204, PLL 205, FIR filter 206, tap controller 207, ML filter 208, reference level detector 209, and error correction unit 210.

Figure 7:
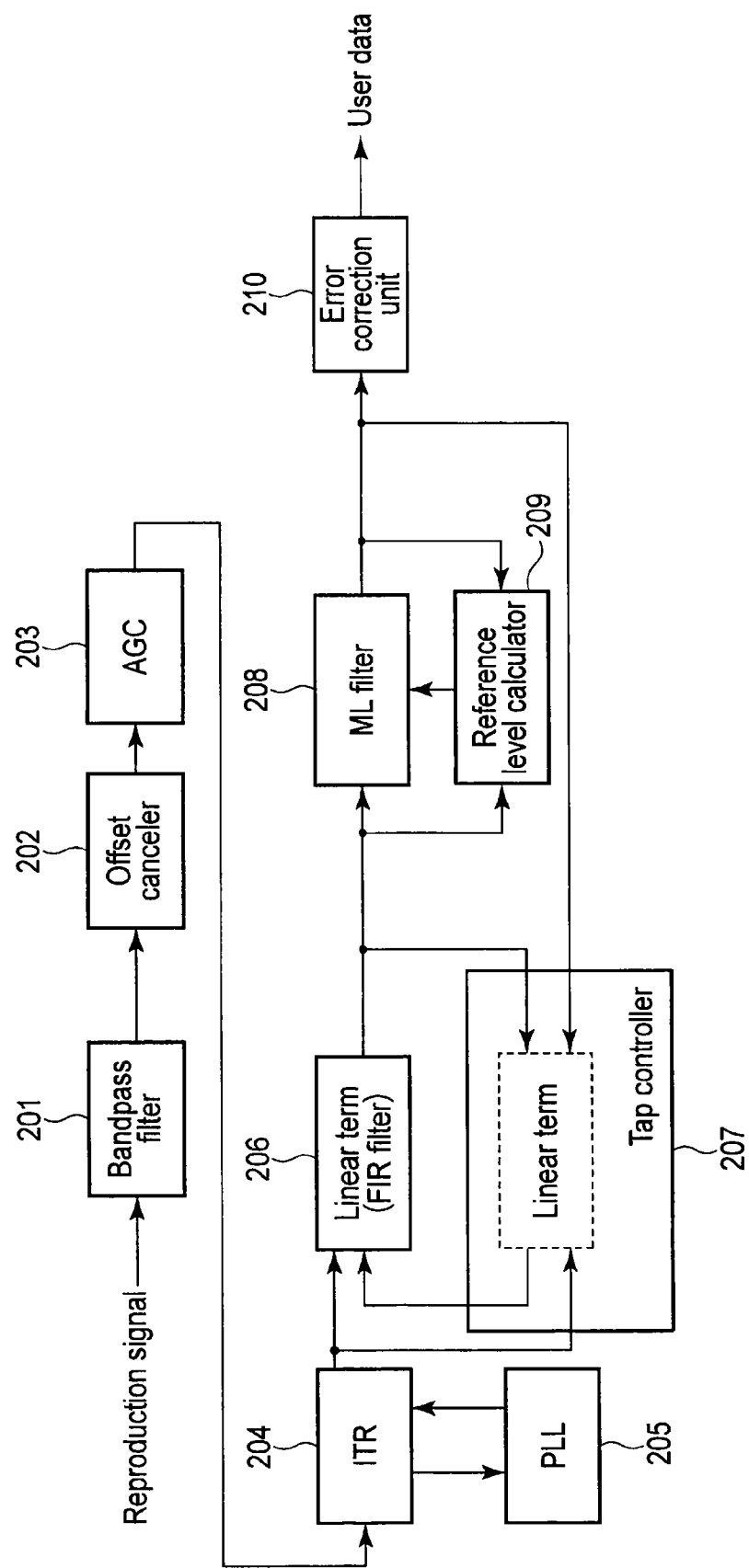
FIG. 7 is a block diagram showing a reproduction signal processor of an information recording/reproduction apparatus according to the first comparative scheme.

The difference of the reproduction signal processor shown in FIG. 7 from that shown in FIG. 1 is a functional unit for suppressing a nonlinear noise component. More specifically, the nonlinear distortion suppressor shown in FIG. 1 is replaced with the FIR filter 206 and tap controller 207 shown in FIG. 7. Also, the correlation noise suppressor shown in FIG. 1 is replaced with the ML filter 208 and reference level calculator 209 shown in FIG. 7. On the other hand, the bandpass filter 201, offset canceler 202, AGC 203, ITR 204, PLL 205, and error correction unit 210 shown in FIG. 7 respectively correspond to the bandpass filter 100, offset canceler 110, AGC 120, ITR 121, PLL 122, and error correction unit 170 shown in FIG. 1.

The FIR filter 206 performs an FIR filtering process on an input signal by using a tap coefficient given from the tap controller 207. The ML filter 208 differs from the ARML filter 150 in that a noise component based on the AR model is not taken into consideration. The reference level calculator 209 calculates offset error=$m_\omega$ from an ideal signal corresponding to branch=ω indicated equation (3) mentioned earlier, and outputs the calculation result to the ML filter 208.

In this experiment, an apparatus (to be referred to as a second comparative scheme for the sake of convenience) in which the ML filter 208 and reference calculator 209 in the first comparative scheme were replaced with the correlation noise suppressor shown in FIG. 1 and an apparatus (to be referred to as a third comparative scheme) in which the FIR filter 206 and tap controller 207 in the first comparative scheme were replaced with the nonlinear distortion suppressor shown in FIG. 1 were further prepared.

FIGS. 8A and 8B show the experimental results of a channel bit error rate as a function of a tangential tilt. FIG. 8A depicts the experimental results of the first, second, and third comparative schemes. The tangential tilt herein mentioned means a gradient [degree] in the tangent direction of an optical recording medium when reproducing the optical recording medium.

According to FIG. 8A, the second and third comparative schemes did not necessarily exhibit characteristics better than that of the first comparative scheme. In other words, even when one of the nonlinear distortion suppressor and correlation noise suppressor shown in FIG. 1 is introduced to the first comparative scheme, it is difficult to stably achieve a good characteristic for an optical recording medium meeting the specifications shown in FIG. 6A.

On the other hand, FIG. 8B depicts the experimental result of the proposed scheme (i.e., the information recording/reproduction apparatus according to this embodiment) in addition to that of the first comparative scheme. According to FIG. 8B, the proposed scheme achieved a characteristic better than that of the first comparative scheme over a broad range. Therefore, the proposed scheme can stably achieve a favorable characteristic for the optical recording medium meeting the specifications shown in FIG. 6A, with respect to at least the tangential tilt.

Figure 9A:
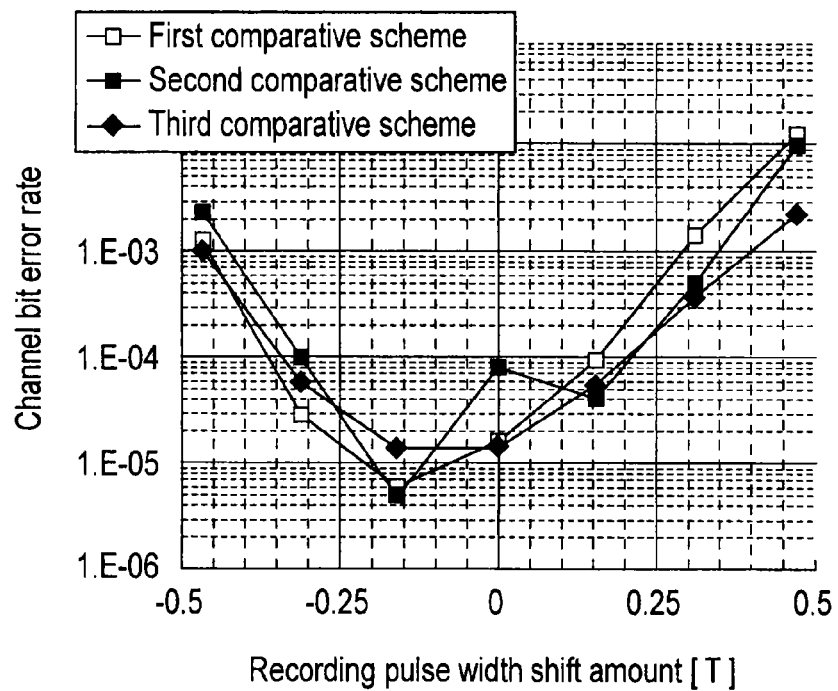
FIG. 9A is a graph showing the channel bit error rate as a function of a recording pulse width shift when applying the first, second, and third comparative schemes.
Figure 9B:
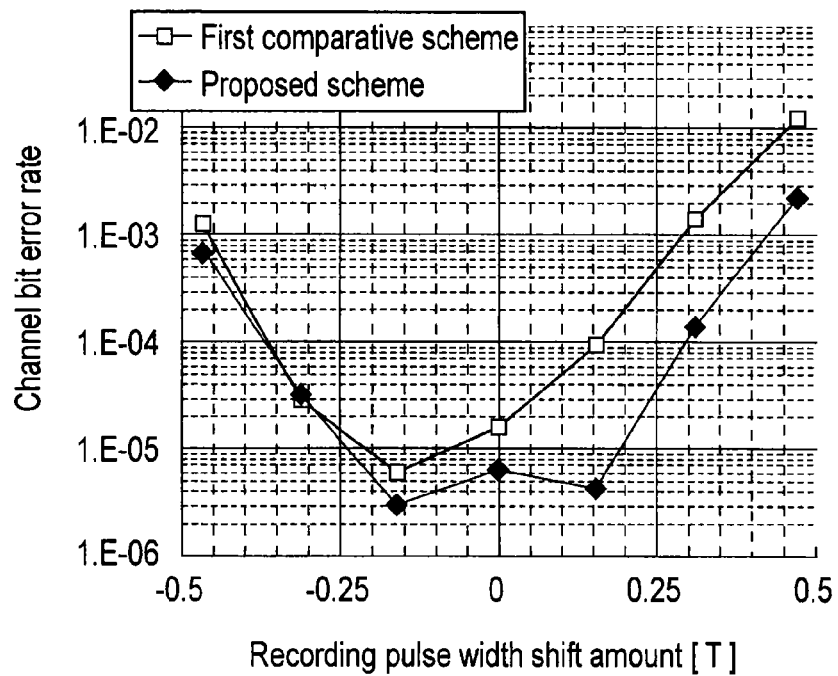
FIG. 9B is a graph showing the channel bit error rate as a function of the recording pulse width shift when applying the first comparative scheme and proposed scheme.

FIGS. 9A and 9B show the experimental results of the channel bit error rate as a function of a shift of a recording pulse width. FIG. 9A depicts the experimental results of the first, second, and third comparative schemes. The shift of the recording pulse width herein mentioned means a shift [T] of the recording pulse width from an optimum value when recording data on an optical recording medium. When the recording pulse width shifts from the optimum value, a mark size to be recorded on an optical recording medium generally changes. This change can lead to generation of a nonlinear noise component in a reproduction signal.

According to FIG. 9A, the second and third comparative schemes did not necessarily exhibit characteristics better than that of the first comparative scheme. In other words, even when one of the nonlinear distortion suppressor and correlation noise suppressor shown in FIG. 1 is introduced to the first comparative scheme, it is difficult to stably achieve a good characteristic for an optical recording medium meeting the specifications shown in FIG. 6A.

On the other hand, FIG. 9B depicts the experimental result of the proposed scheme in addition to that of the first comparative scheme. According to FIG. 9B, the proposed scheme achieved a characteristic better than that of the first comparative scheme over a broad range. Therefore, the proposed scheme can stably achieve a favorable characteristic for the optical recording medium meeting the specifications shown in FIG. 6A, with respect to at least the recording pulse width.

FIGS. 10A and 10B show the experimental results of the channel bit error rate as a function of a recording power error. FIG. 10A depicts the experimental results of the first, second, and third comparative schemes. The recording power error herein mentioned means an error [%] of the recording power from an optimum value when recording data on an optical recording medium. When the recording power shifts from the optimum value, a mark size to be recorded on an optical recording medium generally changes. This change can lead to generation of a nonlinear noise component in a reproduction signal.

According to FIG. 10A, the second and third comparative schemes did not necessarily exhibit characteristics better than that of the first comparative scheme. In other words, even when one of the nonlinear distortion suppressor and correlation noise suppressor shown in FIG. 1 is introduced to the first comparative scheme, it is difficult to stably achieve a good characteristic for an optical recording medium meeting the specifications shown in FIG. 6A.

On the other hand, FIG. 10B depicts the experimental result of the proposed scheme in addition to that of the first comparative scheme. According to FIG. 10B, the proposed scheme achieved a characteristic better than that of the first comparative scheme over a broad range. Therefore, the proposed scheme can stably achieve a favorable characteristic for the optical recording medium meeting the specifications shown in FIG. 6A, with respect to at least the recording power.

From the experimental results shown in FIGS. 8A, 8B, 9A, 9B, 10A, and 10B, the system margin of each scheme with respect to each recording/reproduction condition can be evaluated as shown in FIG. 11. The system margin is equivalent to an error allowable for each of various recording conditions. That is, the reproduction characteristic deteriorates in accordance with an error corresponding to each of the various recording conditions. If this error falls within the system margin, however, correct reproduction data can be obtained by an error correction process or the like.

Channel bit error rate=$1.0E^{-4}$ was used as a threshold for estimating the system margin shown in FIG. 11. This value is an appropriate value when taking account of the correctability of an error correction code scheme assumed to be applied to the error correction unit 170. According to FIG. 11, the proposed scheme can secure a system margin larger than those of the first, second, and third comparative schemes regardless of the recording/reproduction conditions.

In particular, the margin of the proposed scheme with respect to the recording power was 34% which was higher by 8 points or more than those of the first, second, and third comparative schemes, which were about 25% to 26%. Note that the margin of the recording power of an optical recording medium is generally about 20% to 25%.

As described previously, various signal processing parameters can be set in the information recording/reproduction apparatus according to this embodiment. More specifically, the control bandwidth of the noise suppressor, the number of taps to be used in the Volterra filter 130, the control bandwidth of the Volterra filter 130, the noise correlation length to be used in the ARML filter 150, and the control bandwidth of the ARML filter 150 are prepared as the settable signal processing parameters. Setting examples of these parameters will be described below.

FIG. 20A shows the measurement value of i-MLSE when the control bandwidth of the offset suppressor in the information recording/reproduction apparatus according to this embodiment was changed. Referring to FIG. 20A, the abscissa represents the control bandwidth of the offset suppressor, and the ordinate represents i-MLSE. i-MLSE is a performance evaluation index disclosed in a related art (International Symposium on Optical Memory 2009 proceedings, "New Signal Quality Evaluation Method for 33.4 GB/Layer BDs"). The smaller the value of i-MLSE, the smaller a noise component remaining in an equalized signal, so it is possible to evaluate that data can stably be reproduced. According to FIG. 20A, the control bandwidth of the offset suppressor is preferably set within the range of approximately 15 to 25 kHz.

FIG. 20B shows changes in i-MLSE with an increase in number of processing samples in the Volterra filter 130 of the information recording/reproduction apparatus according to this embodiment. For comparison, conditions 1 to 7 were prepared by gradually decreasing a step size parameter in FIG. 20B. That is, the step size parameter of condition 1 is largest, and that of condition 7 is smallest.

Generally, the tap controller 140 performs adaptive control on the tap coefficient, so i-MLSE gradually converges to a favorable value as the number of processing samples increases. The number of processing samples (in other words, the time) required for the convergence decreases as the control bandwidth rises (i.e., the step size parameter increases).

Under conditions 3 to 7, as the number of processing samples increases, i-MLSE gradually converges to a favorable value. Also, the smaller the step size parameter, the larger the number of processing samples required for the convergence. However, excessively increasing the step size parameter is not necessarily preferable. Under conditions 1 and 2, even when the number of processing samples increases, i-MLSE does not improve but slightly worsens.

When taking the above results into account, the control bandwidth of the Volterra filter 130 is preferably set by referring to a condition having a large step size parameter among conditions 3 to 7. Under condition 4, for example, i-MLSE converges to a favorable value (in other words, adaptive control of the tap coefficient converges) when the number of processing samples has reached approximately $2 \times 10^6$. When channel bit rate=132 Mbps, $2 \times 10^6$ samples are equivalent to a time of 1.5 msec. That is, the control bandwidth of the Volterra filter 130 under condition 4 is about 0.7 kHz. According to FIG. 20B, the control bandwidth of the Volterra filter 130 is preferably set within the range of approximately 0.7 kHz or less.

Figure 20C:
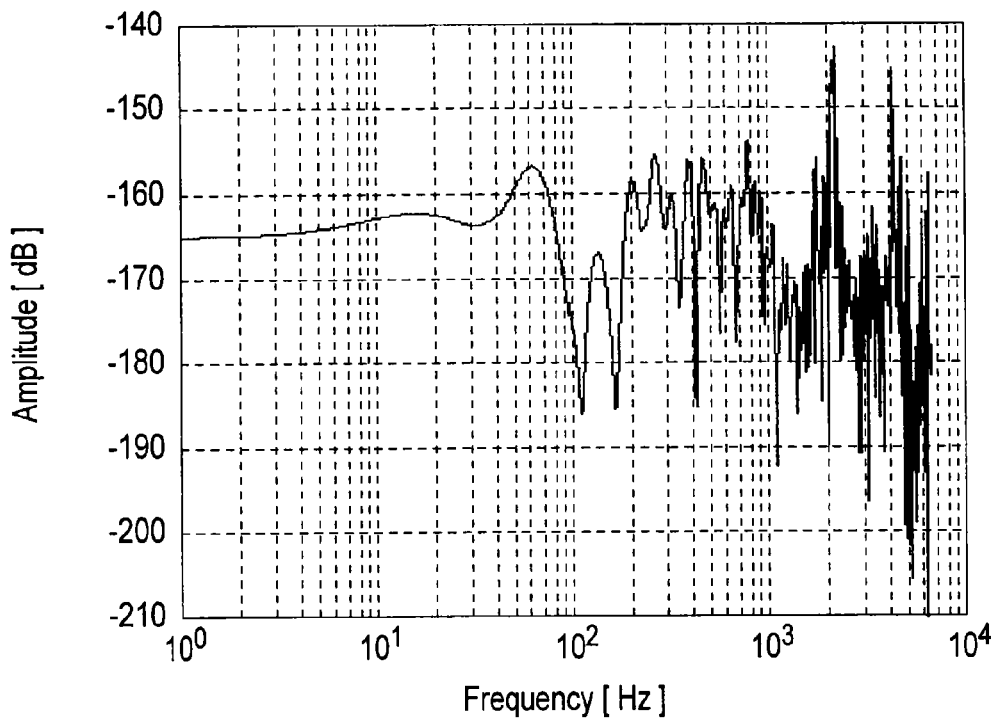
FIG. 20C is a graph exemplarily showing the frequency characteristic of a noise component remaining in an input signal to an ARML filter.

FIG. 20C shows the frequency characteristic of a noise component of a given pattern estimated by the noise estimator 160 in the information recording/reproduction apparatus according to this embodiment. In this frequency characteristic, a large rise appears on a low-frequency side (nearly 60 Hz) from 100 Hz. Also, a plurality of large rises intermittently appear on a high-frequency side from 200 Hz. The noise component on the low-frequency side from 100 Hz should be suppressed by adaptive control of the ARML filter 150. On the other hand, the noise components on the high-frequency side from 200 Hz are components caused by variations in estimation by the noise estimator 160. Accordingly, the control bandwidth of the ARML filter 150 is preferably set lower than, e.g., 300 Hz.

Figure 21A:
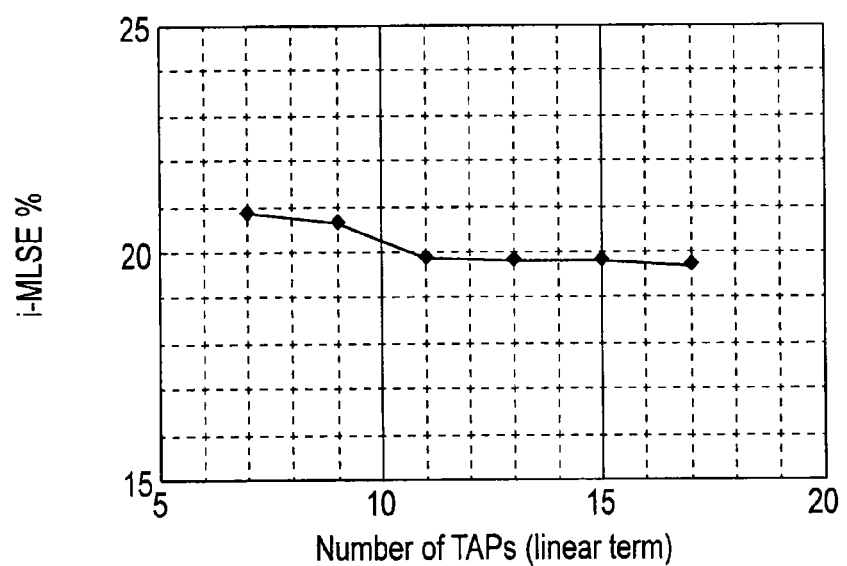
FIG. 21A is a graph exemplarily showing the performance evaluation of the number of taps to be used in a linear filter operation by the Volterra filter.

FIG. 21A shows the measurement value of i-MLSE when the number of taps to be used in the linear filter operation of the Volterra filter 130 in the information recording/reproduction apparatus according to this embodiment was changed. According to FIG. 21A, when the number of taps is approximately 7 (inclusive) to 11 (inclusive), i-MLSE improves as the number of taps increases. However, the width of the improvement of i-MLSE is small when the number of taps is 11 or more. Therefore, the number of taps to be used in the linear filter operation of the Volterra filter 130 is preferably 11 or more.

FIG. 21B shows the measurement value of i-MLSE when the number of taps to be used in the quadratic filter operation of the Volterra filter 130 in the information recording/reproduction apparatus according to this embodiment was changed. According to FIG. 21B, when the number of taps is approximately $11^2$ or less, i-MLSE improves as the number of taps increases. However, the width of the improvement of i-MLSE is small when the number of taps is $11^2$ or more.

Therefore, the number of taps to be used in the quadratic filter operation of the Volterra filter 130 is preferably $11^2$ or more.

FIG. 21C shows the measurement value of i-MLSE when the number of taps to be used in the cubic filter operation of the Volterra filter 130 in the information recording/reproduction apparatus according to this embodiment was changed. According to FIG. 21C, the width of the improvement of i-MLSE is small when the number of taps is approximately $5^3$ or less. Therefore, the number of taps to be used in the cubic filter operation of the Volterra filter is preferably $5^3$ or more.

FIG. 22 shows changes in the channel bit error rate in the output signal of the ARML filter 150 in the information recording/reproduction apparatus according to this embodiment as a function of a change in mark jitter of an optical recording medium. For comparison, FIG. 22 depicts results when the noise correlation length to be used in the ARML filter 150 was set at 0 bits, 1 bit, 2 bits, and 3 bits. According to FIG. 22, when the noise correlation length is 1 bit, the channel bit error rate deteriorates more than when the noise correlation length is 0 bits (i.e., when the ARML filter 150 is equivalent to a normal ML filter). On the other hand, the channel bit error rate largely improves when the noise correlation length is increased to 2 bits. Note that no large difference is found between the channel bit error rates when the noise correlation lengths are 2 bits and 3 bits. Accordingly, the noise correlation length to be used in the ARML filter 150 is preferably 2 bits or more.

When taking account of FIGS. 20A, 20B, 20C, 21A, 21B, 21C, and 22, the various signal processing parameters can be set at values to be exemplified below.

The control bandwidth of the offset suppressor is set at 20 kHz, that of the Volterra filter 130 is set at 0.7 kHz, and that of the ARML filter 150 is set at 200 Hz or less. Note that this setting lowers the control bandwidths of the offset suppressor, Volterra filter 130, and ARML filter 150 in this order, and adaptive control can stably be performed on the Volterra filter 130 and ARML filter 150. In the Volterra filter 130, the number of taps to be used in the linear filter operation is set at 13, that to be used in the quadratic filter operation is set at 13×13, and that to be used in the cubic filter operation is set at 7×7×7. The noise correlation length to be used in the ARML filter 150 is set at 2 bits.

As has been explained above, the information recording/reproduction apparatus according to the first embodiment sequentially applies offset suppression, nonlinear distortion suppression, and correlation noise suppression in order on a reproduction signal. In this information recording/reproduction apparatus, therefore, it is possible to effectively suppress nonlinear noise components remaining in a reproduction signal read from an optical recording medium, and stably reproduce data from the optical recording medium. Also, the information recording/reproduction apparatus can secure large system margins under various recording/reproduction conditions.

Second Embodiment

Figure 17:
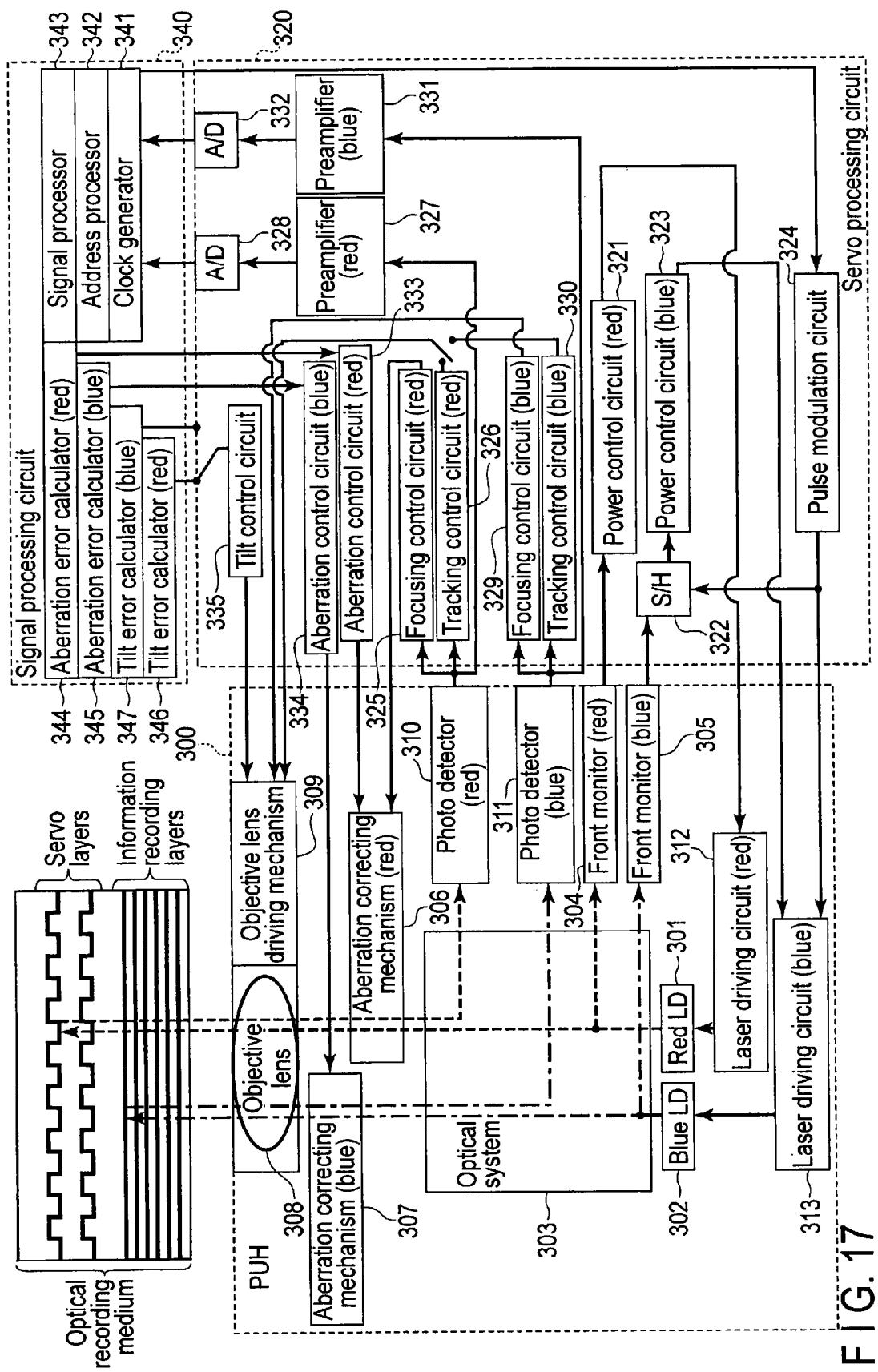
FIG. 17 is a block diagram exemplarily showing the information recording/reproduction apparatus according to the second embodiment.

As shown in FIG. 17, an information recording/reproduction apparatus according to the second embodiment includes a PUH (Pick Up Head) 300, servo processing circuit 320, and signal processing circuit 340. This information recording/reproduction apparatus shown in FIG. 17 can perform data recording/reproduction on an optical recording medium which includes a servo layer and in which an information recording layer is multilayered. Note that in FIG. 17, solid arrows represent the flows of electrical signals, one-dot dashed lines represent the flows of a blue laser (a laser for the information recording layer), and broken arrows represent the flows of a red laser (a laser for the servo layer).

The PUH 300 generates the laser for the servo layer and the laser for the information recording layer. The PUH 300 irradiates the optical recording medium with a part of the laser, and outputs the rest of the laser in the form of an electrical signal to the servo processing circuit 320. Also, the PUH 300 outputs return light from the optical recording medium in the form of an electrical signal to the servo processing circuit 320.

The PUH 300 includes a red LD (Laser Diode) 301, blue LD 302, optical system 303, red laser front monitor 304, blue laser front monitor 305, red laser aberration correcting mechanism 306, blue laser aberration correcting mechanism 307, objective lens 308, objective lens driving mechanism 309, red laser photo detector 310, blue laser photo detector 311, red laser driving circuit 312, and blue laser driving circuit 313.

The LD 301 is a light source of the red laser for the servo layer. The wavelength of the red laser is about 650 nm. The laser driving circuit 312 controls the intensity of the laser generated by the LD 301, in accordance with a control signal from a power control circuit 321 (to be described later). The LD 302 is a light source of the blue laser for the information recording layer. The wavelength of the blue laser is about 405 nm. The laser driving circuit 313 controls the intensity of the laser generated by the LD 302, in accordance with control signals from a power control circuit 323 and pulse modulation circuit 324 (to be described later). Note that the laser driving circuits 312 and 313 can turn on the LDs 301 and 302 at the same time.

The red laser generated while the LD 301 is ON enters the optical system 303. The optical system 303 divides the red laser into front monitor light and medium irradiation light. The front monitor light is condensed to the front monitor 304. The medium irradiation light is condensed to the servo layer of the optical recording medium via the aberration correcting mechanism 306 and objective lens 308. Return light from the servo layer is guided to the photo detector 310 via the objective lens 308, aberration correcting mechanism 306, and optical system 303. The photo detector 310 converts the received return light into an electrical signal, and outputs the signal to a focusing control circuit 325, tracking control circuit 326, and preamplifier 327 (to be described later).

The front monitor 304 converts the front monitor light into an electrical signal, and outputs the signal to the power control circuit 321. Based on a control signal from an aberration control circuit 333 (to be described later), the aberration correcting mechanism 306 controls a wavefront aberration by giving various aberrations (e.g., a spherical aberration, astigmatism, and coma) to laser beams (the medium irradiation light and the return light from the servo layer) passing through the aberration correcting mechanism 306. Also, the aberration correcting mechanism 306 focuses a condensation spot of the red laser on a desired servo layer based on a focusing error signal from the focusing control circuit 325.

The blue laser generated while the LD 302 is ON enters the optical system 303. The optical system 303 divides the blue laser into front monitor light and medium irradiation light. The front monitor light is condensed to the front monitor 305. The medium irradiation light is condensed to the information recording layer of the optical recording medium via the aberration correcting mechanism 307 and objective lens 308. Return light from the information recording layer is guided to the photo detector 311 via the objective lens 308, aberration correcting mechanism 307, and optical system 303. The photo detector 311 converts the received light into an electrical signal, and outputs the signal to a focusing control circuit 329, tracking control circuit 330, and preamplifier 331.

The front monitor 305 converts the front monitor light into an electrical signal, and outputs the signal to a sample and hold circuit (S/H) 322. Based on a control signal from an aberration control circuit 334 (to be described later), the aberration correcting mechanism 307 controls a wavefront aberration by giving various aberrations (e.g., a spherical aberration, astigmatism, and coma) to laser beams (the medium irradiation light and the return light from the information recording layer) passing through the aberration correcting mechanism 307.

The objective lens driving mechanism 309 drives the objective lens 308 in a focusing direction or tracking direction, and controls the tilt state of the objective lens 308.

When recording data on the optical recording medium, the objective lens driving mechanism 309 receives a tracking error signal from the tracking control circuit 326. Based on this tracking error signal, the objective lens driving mechanism 309 causes the condensation spot of the red laser to follow a desired track. Note that the radial position of the condensation spot of the blue laser is controlled together with that of the condensation spot of the red laser.

The objective lens driving mechanism 309 receives a focusing error signal from the focusing control circuit 329. Based on this focusing error signal, the objective lens driving mechanism 309 focuses the condensation spot of the blue laser on a desired information recording layer.

When reproducing data from the optical recording medium, the objective lens driving mechanism 309 receives a tracking error signal from the tracking control circuit 330. Based on this tracking error signal, the objective lens driving mechanism 309 causes the condensation spot of the blue laser to follow a desired track.

The objective lens driving mechanism 309 controls the tilt state of the objective lens 308 based on a control signal from a tilt control circuit 335 (to be described later).

The servo processing circuit 320 receives various electrical signals from the PUH 300 and signal processing circuit 340, generates various control signals based on these electrical signals, and outputs the control signals to the PUH 300.

The servo layer processing circuit 320 includes the red laser power control circuit 321, the sample and hold circuit 322, the blue laser power control circuit 323, the pulse modulation circuit 324, the red laser focusing control circuit 325, the red laser tracking control circuit 326, the red laser preamplifier 327, an analog-to-digital converter (A/D) 328, the blue laser focusing control circuit 329, the blue laser tracking control circuit 330, the blue laser preamplifier 331, an A/D 332, the red laser aberration control circuit 333, the blue laser aberration control circuit 334, and the tilt control circuit 335.

The power control circuit 321 receives an electrical signal from the front monitor 304. The power control circuit 321 generates a control signal for making the input electrical signal close to a desired value, and feeds back the signal to the laser driving circuit 312.

Timing control is performed on the sample and hold circuit 322 by a control signal output from the pulse modulation circuit 324. The sample and hold circuit 322 samples/holds an electrical signal from the front monitor 305, and outputs the signal to the power control circuit 323.

The power control circuit 323 receives the electrical signal from the sample and hold circuit 322. The power control circuit 323 generates a control signal for making the input electrical signal close to a desired value, and feeds back the signal to the laser driving circuit 313.

When recording data, the pulse modulation circuit 324 receives a reference clock signal from a clock generator 341 (to be described later), and receives a recording signal (e.g., NRZI (Non Return Zero Inversion) signal (to be described later)) from a signal processor 343 (to be described later). The pulse modulation circuit 324 generates a control signal based on the reference clock signal and recording signal, and outputs the control signal to the laser driving circuit 313 and sample and hold circuit 322. As a result, the laser intensity of the LD 302 is modulated into the form of a pulse. For example, the laser intensity of the LD 302 rises in a portion where recording data is "1", and the LD 302 is turned off in a portion where recording data is "0".

The focusing control circuit 325 receives an electrical signal from the photo detector 310. The focusing control circuit 325 generates a focusing error signal by arithmetically processing the input electrical signal based on, e.g., a knife-edge method or astigmatic method. The focusing control circuit 325 outputs the focusing error signal to the aberration correcting mechanism 306.

When recording data on the optical recording medium, the tracking control circuit 326 receives an electrical signal from the photo detector 310. The tracking control circuit 326 generates a tracking error signal by arithmetically processing the input electrical signal based on, e.g., a push-pull method or DPP (Differential Push-Pull) method. The tracking control circuit 326 outputs the tracking error signal to the objective lens driving mechanism 309 and a PUH driving mechanism (not shown).

The preamplifier 327 receives an electrical signal from the photo detector 310. The preamplifier 327 adjusts the amplitude of the input electrical signal in accordance with the gain, and outputs the signal to the A/D 328. The A/D 328 receives the signal from the preamplifier 327, performs analog-to-digital conversion on the received signal, and outputs the signal to the signal processing circuit 340.

The focusing control circuit 329 receives an electrical signal from the photo detector 311. The focusing control circuit 329 generates a focusing error signal by arithmetically processing the input electrical signal based on, e.g., a knife-edge method or astigmatic method. The focusing control circuit 329 outputs the focusing error signal to the objective lens driving mechanism 309.

When reproducing data from the optical recording medium, the tracking control circuit 330 receives an electrical signal from the photo detector 311. The tracking control circuit 330 generates a tracking error signal by arithmetically processing the input electrical signal based on, e.g., a DPD (Differential Phase Detection) method. The tracking control circuit 330 outputs the tracking error signal to the objective lens driving mechanism 309 and PUH driving mechanism (not shown).

The preamplifier 331 receives an electrical signal from the photo detector 311. The preamplifier 331 adjusts the amplitude of the input electrical signal in accordance with the gain, and outputs the signal to the A/D 332. The A/D 332 receives the signal from the preamplifier 331, performs analog-to-digital conversion on the received signal, and outputs the signal to the signal processing circuit 340.

The aberration control circuit 333 receives aberration error data from an aberration error calculator 344 (to be described later), and generates a control signal based on the aberration error data. The aberration control circuit 333 outputs the control signal to the aberration correcting mechanism 306.

The aberration control circuit 334 receives aberration error data from an aberration error calculator 345 (to be described later), and generates a control signal based on the aberration error data. The aberration control circuit 334 outputs the control signal to the aberration correcting mechanism 307.

The tilt control circuit 335 receives tilt error data from a tilt error calculator 346 or 347 (to be described later), and generates a control signal based on the tilt error data. The tilt control circuit 335 outputs the control signal to the objective lens driving mechanism 309.

The signal processing circuit 340 processes a reproduction signal from the optical recording medium, and generates a recording signal to the optical recording medium. The signal processing circuit 340 includes the clock generator 341, an address processor 342, the signal processor 343, the red laser aberration error calculator 344, the blue laser aberration error calculator 345, red laser tilt error calculator 346, and blue laser tilt error calculator 347.

The clock generator 341 generates a reference clock signal, and supplies the signal to the pulse modulation circuit 324. The address processor 342 performs processing pertaining to address information, such as read of address information. The read address information is transmitted to a controller.

The signal processor 343 includes the reproduction signal processor exemplarily shown in FIG. 1, and a recording signal processor (not shown).

The recording signal processor receives user data from a controller (not shown), and converts the user data into a data sequence recordable on the optical recording medium. More specifically, the recording signal processor performs, on the user data, a scrambling process for randomizing a data pattern, error correction encoding (e.g., Reed-Solomon coding or LDPC coding) for error correction, or an interleaving process for avoiding consecutive errors. Furthermore, the recording signal processor adds, to the user data, a sector address number equivalent to address information of the data, and a burst detection subcode for detecting a burst error. Then, the recording signal processor performs 17PP (Parity Preserved) modulation or ETM (Eight to Twelve Modulation) for controlling a minimum inversion length of the user data by restricting the run length, and performs NRZI conversion, thereby obtaining a data sequence recordable on the optical recording medium.

The reproduction signal processor receives reproduction signals from the A/D 328 and A/D 332, and performs an adaptive filtering process for suppressing the nonlinear noise component explained with reference to FIG. 1. In addition, the reproduction signal processor performs, on the reproduction signals, a demodulation process corresponding to the modulation scheme of restricting the run length described above, and error correction decoding corresponding to the error correction encoding scheme, thereby restoring the user data. The restored user data is transmitted to the controller.

The aberration error calculator 344 receives a digital signal from the A/D 328, and calculates an aberration error amount based on the received signal. The aberration error calculator 344 outputs the aberration error data to the aberration control circuit 333.

The aberration error calculator 345 receives a digital signal from the A/D 332, and calculates an aberration error amount based on the received signal. The aberration error calculator 345 outputs the aberration error data to the aberration control circuit 334.

The tilt error calculator 346 receives a digital signal from the A/D 328, and calculates a tilt error amount based on the received signal. The tilt error calculator 346 outputs the tilt error data to the tilt control circuit 335.

The tilt error calculator 347 receives a digital signal from the A/D 332, and calculates a tilt error amount based on the received signal. The tilt error calculator 347 outputs the tilt error data to the tilt control circuit 335.

Figure 12A:
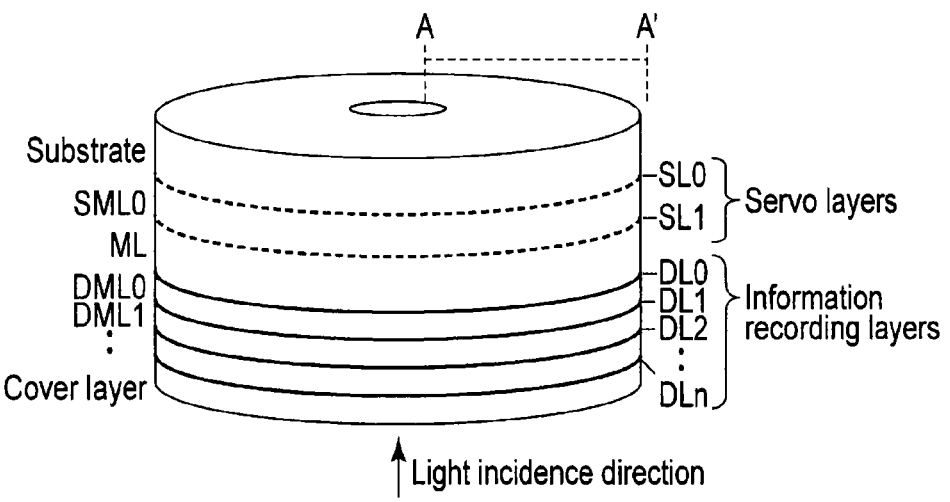
FIG. 12A is a view exemplarily showing an optical recording medium readable by an information recording/reproduction apparatus according to the second embodiment.
Figure 12B:
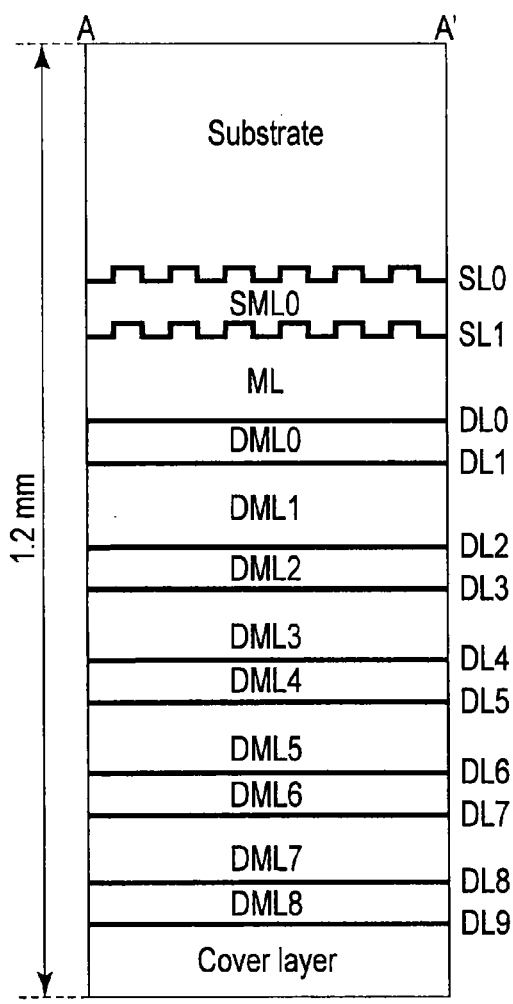
FIG. 12B is an A-A' sectional view of FIG. 12A.

FIG. 12A exemplarily shows the optical recording medium including the servo layer and readable by the information recording/reproduction apparatus according to this embodiment. FIG. 12B is an A-A' sectional view of FIG. 12A. The outer shape of the optical recording medium is a disk shape, and a clamp hole is formed in the center of the disk. The optical recording medium has a layered structure in which two servo layers and a plurality of information recording layers are formed. When viewed in a light incidence direction, the servo layers are formed on the back side, and the information recording layers are formed on the front side. More specifically, a disk substrate, servo layer No. 0 (SL0), inter-servo-layer middle layer No. 0 (SML0), servo layer No. 1 (SL1), middle layer (ML), information recording layer No. 0 (DL0), inter-information-recording-layer middle layer No. 0 (DML0), information recording layer No. 1 (DL1), . . . , are formed in this order from the back side in the light incidence direction. Note that a cover layer is formed on the most front side when viewed in the light incidence direction.

As shown in FIG. 12B, the thickness of the optical recording medium is 1.2 mm, and the thickness of the disk substrate of the medium is about 0.8 mm. The thickness of the inter-servo-layer middle layer No. 0 (SML0) is determined by taking account of the wavelength (e.g., 605 nm) of a laser for the servo layer, and can be designed to be, e.g., 55 µm. The thickness of the middle layer (ML) is 126 µm. The thickness of the cover layer is 50 µm.

To reduce the influence of multiple reflections, a plurality of types of thicknesses can be designed for the inter-information-recording-layer middle layer. When these thicknesses are appropriately designed such that adjacent inter-information-recording-layer middle layers have different thicknesses, reflected light from a non-reproduction layer is not condensed to a reproduction layer. For example, the thickness of a layer of the first type is designed to be relatively small (e.g., 12 µm), and the thickness of a layer of the second type is designed to be relatively larger (e.g., 16 µm). In this case, the thickness of the optical recording medium can be decreased by designing the medium so that the total number of layers of the first type is equal to or larger than the total number of layers of the second type. The optical recording medium shown in FIGS. 12A and 12B is preferably designed so as to handle even-numbered, inter-information-recording-layer middle layers (DML0, DML2, . . . ) as layers of the first type, and odd-numbered, inter-information-recording-layer middle layers (DML1, DML3, . . . ) as layers of the second type. Note that when the thickness of the optical recording medium is reduced, an aberration occurring when reproducing information from a back-side layer can be reduced.

The thickness of each layer can be designed based on the wavelength of the laser for the information recording layers, and the wavelength of the laser for the servo layers. For example, the wavelength of the laser for the servo layers is longer than that of the laser for the information recording layers. To reduce the influence of inter-layer crosstalk, the thickness of the inter-servo-layer middle layer is designed to be larger than that of the inter-information-recording-layer middle layer. Also, no inter-layer jumping action of a condensation spot occurs between the servo layer and information recording layer. Accordingly, the thickness of the middle layer (ML) is designed to be larger than that of the inter-servo-layer middle layer, thereby reducing the influence of crosstalk.

Each of the inter-servo-layer middle layer, middle layer (ML), and inter-information-recording-layer middle layer is so designed as to exhibit a transmittance close to 100% with respect to the laser for the servo layers and the laser for the information recording layers. Also, the servo layer is formed by a film made of a material such as a metal having a submicron-order thickness. In particular, the servo layer No. 0 (SL0) is formed by a semi-transmitting film which reflects part of the laser for the servo layers, and transmits part of the laser. As will be described later, a track serving as a servo guide is formed in the servo layer. The information recording layer is formed by a multilayered film containing a storage material for which information can be recorded, reproduced, and erased by the laser for the information recording layer. This multilayered film transmits the servo layer laser. Furthermore, this multilayered film transmits part of the laser for the information recording layer, reflects part of the laser, and absorbs part of the laser.

Figure 13:
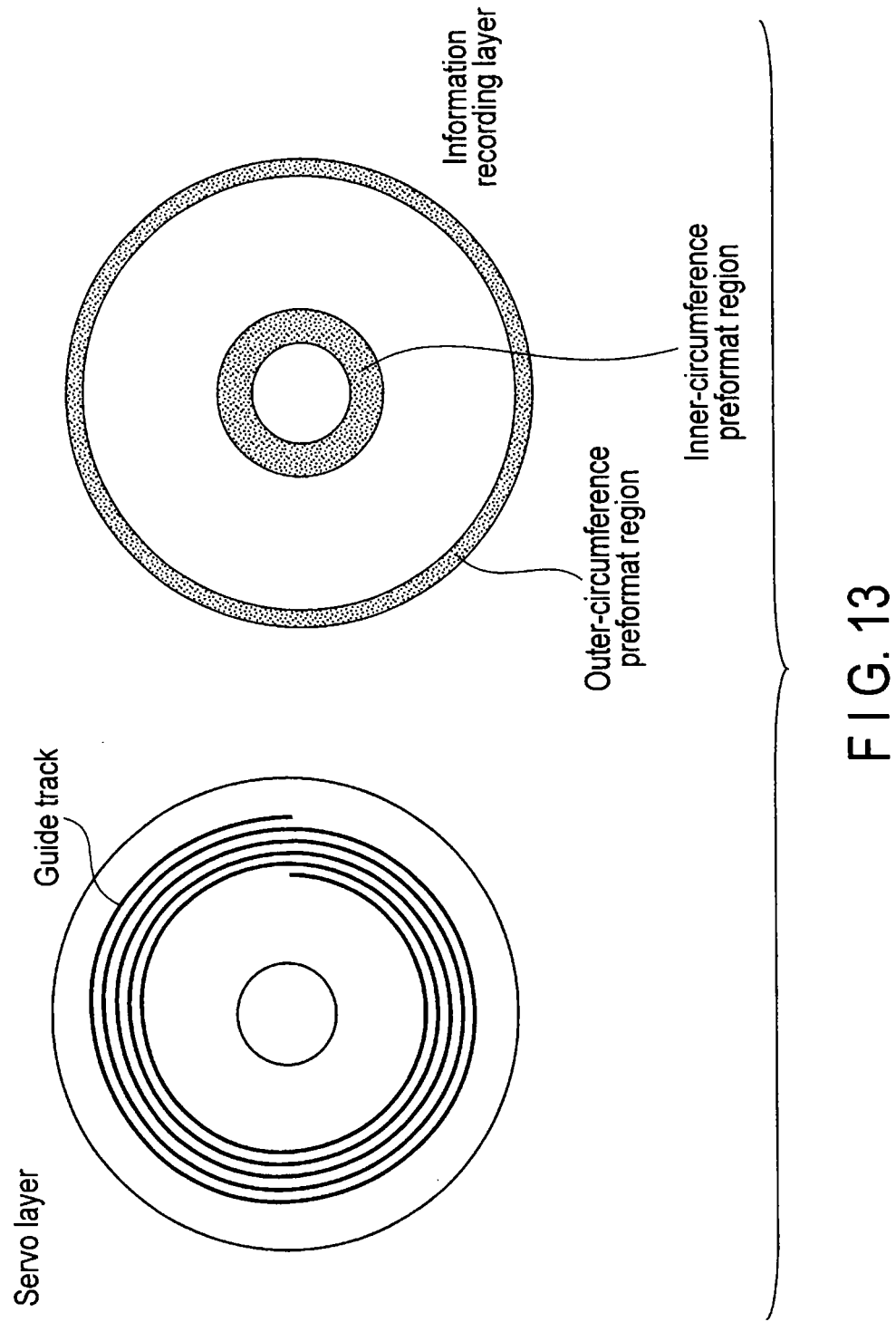
FIG. 13 is a view exemplarily showing a servo layer and information recording layer of an optical recording medium readable by the information recording/reproduction apparatus according to the second embodiment.

FIG. 13 depicts examples of the servo layer and information recording layer. A spiral track is formed in the servo layer. Note that when the total number of servo layers is two, spiral tracks in the opposite directions are formed in the two servo layers. That is, when a clockwise spiral track is formed in the servo layer No. 0 (SL0), a counterclockwise spiral track is formed in the servo layer No. 1 (SL1). On the other hand, it is also possible to form a counterclockwise spiral track in the servo layer No. 0 (SL0), and a clockwise spiral track in the servo layer No. 1 (SL1).

The track includes a continuously formed groove. The groove is given a micro vibration (wobble) in the radial direction of the optical recording medium. By modulating the frequency or phase of this wobble, or arranging a recording mark such as a prepit in a portion of the track, address information indicating the track number and the position in the circumferential direction, disk information indicating the characteristics of the optical recording medium, and the like are recorded in the servo layer.

On the other hand, no track is formed in the information recording layer. Therefore, recording/reproduction of user data or the like to the information recording layer is performed based on the track formed in the servo layer. Note that preformat regions are formed on the inner and outer circumferences of the information recording layer. In the inner-circumference preformat region and outer-circumference preformat region, a learning pattern for recording waveform optimization, management information for managing the disk, and the like are recorded.

In the servo layer, disk information shown in, e.g., FIG. 16 is recorded by using wobble modulation or a recording mark. More specifically, the disk information can contain information indicating the type of disk format, information indicating the disk size (e.g., a physical size such as the diameter of the optical recording medium), and information indicating a maximum transfer rate. The disk information can contain information indicating the number of servo layers, information indicating the number of information recording layers, and information indicating the type of format (e.g., write-once recording or packet recording) applicable to the information recording layers. The disk information can contain information indicating the recording density (e.g., the track pitch of a recording mark sequence, and the mark pitch in the line direction). The disk information can contain information area layout information indicating the layout of a user data recording area, and the layout of a management information recording area in which information (e.g., a learning pattern for recording waveform optimization) other than the user data to be recorded, of areas to which addresses are allocated in the optical recording medium. The disk information can contain information indicating the degree of the Volterra filter 130 suitable (e.g., optimum) for reproduction of the optical recording medium and the number of taps necessary for a filter operation of each degree, and information indicating a noise correlation length necessary in the ARML filter 150. The disk information can contain information indicating the control bandwidth of an adaptive control filter (e.g., a step size parameter of the Volterra filter 130, and a band for calculating a noise parameter to be given to the ARML filter 150 (or a period of the update timing of the noise parameter)). The disk information can contain information indicating a reproduction power permitted by the optical recording medium, information indicating a recording power suitable (e.g., optimum) for the optical recording medium, and recording pulse information indicating the shape (e.g., the width and interval) of recording pulses. Furthermore, a reserve region for the disk information may also be formed on the optical recording medium.

As described above, the spiral track is formed in the servo layer. As shown in FIG. 14, this track is formed by cutting a groove on a surface called a land. The groove is so formed as to shift in the inner circumferential direction or outer circumferential direction by half of the groove pitch for each round of the optical recording medium. Accordingly, the track has a single-spiral structure in which the groove and land are alternately switched for each round of the optical recording medium.

As described above, the groove is zigzagged because wobble modulation is performed based on the address management data containing the address information, or width modulation for changing the groove width is performed. FIG. 15 exemplarily shows wobble phase modulation. According to this phase modulation shown in FIG. 15, 1-bit information is expressed by the phase of a sine-wave-like 4-wave wobble. In the phase modulation shown in FIG. 15, a phase at which zigzagging first advances toward the inner circumference in the scanning direction is allocated to "0", and a phase at which zigzagging first advances outside in the scanning direction is allocated to "1".

FIG. 18 shows an example of the recording waveform to be used by the information recording/reproduction apparatus according to this embodiment. More specifically, in FIG. 18, the recording waveform is a type of waveform called "multi pulse", by which a plurality of pulses are used to record one mark. Of the plurality of pulses, the leading pulse is called a first pulse, and the end pulse is called a last pulse. Also, of the plurality of pulses, pulses other than the first pulse and last pulse are called multi pulses. After the last pulse, a period (cooling pulse) for outputting bias power 1 is prepared.

The shape of the recording waveform is defined by four levels, i.e., recording power, erase power, bias power 1, and bias power 2. Also, the shape of the recording waveform is defined for time by using various time parameters based on the rising edge of an NRZI signal and a clock signal. More specifically, this time information contains, e.g., first pulse start time F1, first pulse end time F3, and first pulse interval F2. Also, time parameters which readily influence the formation of a recording mark, e.g., first pulse start time F1 and last pulse end time L3 can dynamically be changed during data recording in accordance with the NRZI signal. These various parameters for deciding the shape of the recording waveform are managed as recording waveform shape information in a memory of the information recording/reproduction apparatus, and recorded as physical format information and management information on the optical recording medium.

Note that the reference clock is used in timing control in the information recording/reproduction apparatus. T represents the period of the reference clock. The reference clock is generated by the clock generator 341 described above. The NRZI signal is obtained by converging recording data into an NRZI format.

When recording data on the optical recording medium, the above-described pulse modulation circuit 324 generates a recording pulse based on the recording waveform shape information and the NRZI signal output from the signal processor 343. The laser driving circuit 313 drives the LD 302 in accordance with the recording pulse. Consequently, the power of the laser irradiating the optical recording medium is modulated like the recording waveform shown in FIG. 18. The information recording/reproduction apparatus controls the shape of a recording mark by the level of the recording power, the width of each pulse, and the like. For example, when the level of the recording power rises, the width of a recording mark increases. Also, when the first pulse start time is advanced, the start position of a recording mark is advanced, and as a consequence the recording mark length increases. In other words, when the level of the recording power, the width of each pulse, and the like shift from optimum values, the shape of a recording mark also shifts from an optimum shape, so a nonlinear noise component is generated in a reproduction signal.

In the first embodiment, the system margin is evaluated based on the experimental results. When designing the optical recording medium and information recording/reproduction apparatus, the system margin is allocated as it is, subdivided as tolerances for various error elements. For example, when the margin of the recording power is 25%, about 12% is allocated as a tolerance to the recording power error of the information recording/reproduction apparatus, and about 13% as a remainder is allocated as a tolerance to the manufacturing error of the optical recording medium.

The error of the recording power in the information recording/reproduction apparatus mainly has two types of elements. One element is an error occurring in an automatic power adjusting process for maintaining the recording power constant. The other element is an error occurring in a recording power optimizing process for deciding a recording power optimum for the optical recording medium. Therefore, 6% is allocated as a tolerance to each of these two error elements. The manufacturing error of the optical recording medium also has two types of elements. One element is a variation in characteristic between optical recording media. The other element is a variation in characteristic between information recording layers in the same optical recording medium. 8% is allocated as a tolerance to the variation in characteristic between optical recording media. 5% is allocated as a tolerance to the variation in characteristic between information recording layers in the same optical recording medium. When the information recording/reproduction apparatus and optical recording medium are designed based on the allocated tolerances, the information recording/reproduction apparatus can stably reproduce data from the optical recording medium.

The variation in characteristic between information recording layers in the optical recording medium will further be explained. The characteristic of the information recording layer includes not only a variation in sensitivity of the information recording layer to the recording power, but also a variation in transmittance which decides the amount of light passing through the information recording layer. That is, when the information recording layer is multilayered, it is necessary to take account of not only a variation in sensitivity of a given information recording layer, but also a variation in transmittance of one or more information recording layers formed on the front side (laser incidence surface side) of the given information recording layer.

For example, it is possible to assume that the variation in sensitivity of each information recording layer is about 3%, and the variation in transmittance of each information recording layer is about 1%. Under this assumption, it is estimated that the variation in characteristic of an information recording layer formed on the most front side is 3%. The variation in characteristic of a given information recording layer formed from the second layer is evaluated by adding the variation in transmittance of each information recording layer formed on the front side of the given information recording layer. That is, it is estimated that the variation in characteristic of the second information recording layer is 4%, that of the third information recording layer is 5%, and that of the fourth information recording layer is 6%. That is, the variation in characteristic of the fourth information recording layer exceeds the above-described tolerance (=5%).

Accordingly, to stably record/reproduce data with respect to an optical recording medium including four or more information recording layers when the recording power margin is about 25%, it is necessary to take measures, e.g., improve the characteristic of the film of the information recording layer.

As described above, however, the recording power margin is extended to 34% in the information recording/reproduction apparatus according to this embodiment. Therefore, by distributing a part of this extension of the margin as a tolerance for the characteristic variation of each information recording layer in the optical recording medium, the tolerance can be extended to, e.g., 10%. Accordingly, the information recording/reproduction apparatus according to this embodiment can stably record/reproduce data with respect to an optical recording medium in which an information recording layer is multilayered into four or more layers, without improving the characteristic of the film of the information recording layer. That is, an optical recording medium capable of stable data recording/reproduction can be manufactured at low cost by multilayering the conventional information recording layer.

As described previously, the information recording layer has no guiding groove structure in an optical recording medium including a servo layer. This makes it possible to reduce the manufacturing cost of the optical recording medium. In addition, the transmittance of the information recording layer can be improved because no diffraction of light due to the above-mentioned groove structure occurs. That is, it is possible to suppress a decrease in reflectance of the optical recording medium by multilayering the information recording layer.

On the other hand, for the optical recording medium including the servo layer, the laser for the servo layer and the laser for the information recording layer are different as described earlier. When recording/reproducing data with respect to the information recording layer, the condensation spot of the laser for the information recording layer is positioned in accordance with the guide of the servo layer. Even when performing this positioning, however, the position in the radial direction of condensation spot of the laser for the information recording layer and that in the radial direction of the condensation spot of the laser for the servo layer do not completely match, and a positional shift occurs between them due to, e.g., a tilt of the optical recording medium or objective lens. Accordingly, the optical recording medium including the servo layer is inferior to an ordinary optical recording medium (i.e., an optical recording medium in which an information recording layer includes a guiding groove structure) in positioning accuracy in the radial direction of the condensation spot of the laser for the information recording layer. In the optical recording medium including the servo layer, therefore, a positioning procedure in, e.g., an additional write process which is resumed after data recording is interrupted is more complex than that of an ordinary optical recording medium.

When recording data on the optical recording medium, the information recording/reproduction apparatus generally performs the above-described recording power optimizing process in, e.g., the preformat region of the information recording layer. More specifically, the information recording/reproduction apparatus records a test pattern for learning while changing the recording power in a specific region of an information recording layer, and reproduces the recorded test pattern, thereby deciding an optimum power for the information recording layer. In an ordinary optical recording medium, an error in this recording power optimizing process can be suppressed to about 6%. On the other hand, in the optical recording medium including the servo layer, it is difficult to suppress the error caused by the recording power optimizing process to about 6% due to the influence of, e.g., the deterioration of the positioning accuracy and the complexity of the positioning procedure described above. In the information recording/reproduction apparatus according to this embodiment, therefore, a tolerance for the error caused by the recording power optimizing process is extended to, e.g., 9% by distributing part of the above-described margin extension as the tolerance. This makes it possible to stably record/reproduce data with respect to the optical recording medium including the servo layer.

The information recording/reproduction apparatus according to this embodiment can read an optical recording medium satisfying, e.g., specifications shown in FIG. 19A. According to the specifications shown in FIG. 19A, the information recording layer type is a write-once type, the number of servo layers is 2, a guide structure formed in each servo layer is land & groove, the number of information recording layers is 5 or more, and the channel bit length is 56.28 [nm]. Also, the track pitch is 0.32 [μm], the data recording capacity of each information recording layer is 32.0 GB, the reflectance of each information recording layer is about 1%, and data is recorded as it is, modulated by the 17 modulation scheme.

On the other hand, the information recording/reproduction apparatus according to this embodiment satisfies, e.g., specifications shown in FIG. 19B. According to the specifications shown in FIG. 19B, the NA of an objective lens for the servo layer is 0.6, the wavelength of a laser for the servo layer is 660 [nm], and the reproduction power for the servo layer is 2.0 [mW]. Also, the NA of an objective lens for the information recording layer is 0.85, the wavelength of a laser for the information recording layer is 405 [nm], and the reproduction power for the information recording layer is 1.2 [mW]. The PR class used in the signal processing is 12221, and the channel bit rate is 132 Mbps. The degree of the Volterra filter 130 is 3, the number of taps of the linear filter operation is 13, the number of taps of the quadratic filter operation is 13×13, and the number of taps of the cubic filter operation is 7×7×7. In the ARML filter 150, the correlation noise length (=L) is set at 2 bits.

The information recording/reproduction apparatus according to this embodiment performs, e.g., a data recording process shown in FIG. 23A on the optical recording medium including the servo layer.

This data recording process shown in FIG. 23A starts from step ST1-1. In step ST1-1, the information recording/reproduction apparatus turns on the laser for the servo layer (e.g., a red laser having a wavelength of 660 [nm]), and focuses the condensation spot of the laser on a desired servo layer of the optical recording medium. Subsequently, the information recording/reproduction apparatus reads disk information from the guide track formed in the desired servo layer by using the laser for the servo layer (step ST1-2). For example, the disk information read in step ST1-2 is as shown in FIG. 16. The information recording/reproduction apparatus can confirm the number of information recording layers of the optical recording medium, the type of format applicable to the information recording layers, and the like by referring to the disk information.

Based on the disk information read in step ST1-2, the information recording/reproduction apparatus starts processing for the information recording layer. More specifically, the information recording/reproduction apparatus turns on the laser for the information recording layer (e.g., a blue laser having a wavelength of 405 [nm]), and focuses the condensation spot of the laser on a desired information recording layer of the optical recording medium (step ST1-3). Subsequently, based on the guide track formed in the servo layer, the information recording/reproduction apparatus moves the condensation spots of the lasers for the servo layer and information recording layer to a radial position set as a recording learning region for optimizing the recording conditions of the information recording layer (step ST1-4). The information recording/reproduction apparatus performs recording learning in the recording learning region, and optimizes the recording power, pulse width, and the like (step ST1-5). When step ST1-5 is complete, the process advances to step ST1-6.

In step ST1-6, based on the guide track formed in the servo layer, the information recording/reproduction apparatus moves the condensation spots of the lasers for the servo layer and information recording layer to a desired radial position in the information recording layer. The information recording/reproduction apparatus records user data based on the recording power, pulse width, and the like optimized in step ST1-5 (step ST1-7). Step ST1-7 is repeated until the target user data is entirely recorded (step ST1-8), and the data recording process is complete.

The information recording/reproduction apparatus according to this embodiment performs a data reproduction process shown in FIG. 23B on the optical recording medium including the servo layer.

This data reproduction process shown in FIG. 23B starts from step ST2-1. In step ST2-1, the information recording/reproduction apparatus turns on the laser for the servo layer (e.g., a red laser having a wavelength of 660 [nm]), and focuses the condensation spot of the laser on a desired servo layer of the optical recording medium. Subsequently, the information recording/reproduction apparatus reads disk information from the guide track formed in the desired servo layer by using the laser for the servo layer (step ST2-2). For example, the disk information read in step ST2-2 is as shown in FIG. 16. The information recording/reproduction apparatus can confirm the number of information recording layers of the optical recording medium, the type of format applicable to the information recording layers, and the like by referring to the disk information. Also, the information recording/reproduction apparatus can confirm the number of taps of an equalizer suitable for reproducing data from the information recording layer of the optical recording medium (e.g., the number of taps of the Volterra filter 130), and the noise correlation length of the ARML filter 150. In addition, the information recording/reproduction apparatus can confirm control bandwidth information (e.g., the step size parameter of the Volterra filter 130, and a band for calculating a noise parameter to be given to the ARML filter 150 (or the period of the update timing of the noise parameter)) of an adaptive control filter suitable for reproducing data from the information recording layer of the optical recording medium.

Based on the disk information read in step ST2-2, the information recording/reproduction apparatus sets various signal processing parameters (step ST2-3). More specifically, the information recording/reproduction apparatus sets the number of taps of the Volterra filter 130, and the noise correlation length of the ARML filter 150. Furthermore, the information recording/reproduction apparatus sets the control bandwidths of the offset suppressor, Volterra filter 130, and ARML filter 150. When step ST2-3 is complete, the process advances to step ST2-4.

In step ST2-4, the information recording/reproduction apparatus turns on the laser for the information recording layer (e.g., a blue laser having a wavelength of 405 [nm]), and focuses the condensation spot of the laser on a desired information recording layer of the optical recording medium. Subsequently, based on the guide track formed in the servo layer, the information recording/reproduction apparatus moves the condensation spots of the lasers for the servo layer and information recording layer to a desired radial position in the information recording layer (step ST2-5). The information recording/reproduction apparatus reads user data (step ST2-6). When the target user data is entirely read, the data reproduction process is complete. Note that in the data reproduction process shown in FIG. 23B, the various signal processing parameters are set at appropriate values in step ST2-3. Therefore, data can stably be reproduced from the optical recording medium which includes the servo layer and in which the information recording layer is multilayered.

As has been explained above, the information recording/reproduction apparatus according to the second embodiment performs data recording/reproduction on the optical recording medium which includes the servo layer and in which the information recording layer is multilayered. More specifically, this information recording/reproduction apparatus performs reproduction signal processing which is the same as or similar to that of the first embodiment, and hence effectively suppresses nonlinear noise components in a reproduction signal. In this information recording/reproduction apparatus, therefore, a large system margin is secured, so data recording/reproduction can stably be performed on the above-mentioned optical recording medium.

The processing in the above-described embodiments can be implemented using a general-purpose computer as basic hardware. A program implementing the processing in each of the above-described embodiments may be stored in a computer readable storage medium for provision. The program is stored in the storage medium as a file in an installable or executable format. The storage medium is a magnetic disk, an optical disc (CD-ROM, CD-R, DVD, or the like), a magnetooptic disc (MO or the like), a semiconductor memory, or the like. That is, the storage medium may be in any format provided that a program can be stored in the storage medium and that a computer can read the program from the storage medium. Furthermore, the program implementing the processing in each of the above-described embodiments may be stored on a computer (server) connected to a network such as the Internet so as to be downloaded into a computer (client) via the network.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A signal processing apparatus comprising:
    a first signal processor which suppresses an offset component remaining in a reproduction signal read from an optical recording medium to obtain a first signal;
    a second signal processor which suppresses a nonlinear distortion component remaining in the first signal to obtain a second signal; and
    a third signal processor which suppresses a correlation noise component remaining in the second signal to obtain a third signal, wherein
    the second signal processor comprises a Volterra filter,
    the third signal processor comprises an ARML filter,
    the first signal processor, the second signal processor, and the third signal processor are adaptive filters,
    a control bandwidth of the first signal processor is higher than that of the second signal processor, and
    the control bandwidth of the second signal processor is higher than that of the third signal processor.

2. An information reproduction apparatus comprising:
    a first signal processor which suppresses an offset component remaining in a reproduction signal read from an optical recording medium to obtain a first signal;
    a second signal processor which suppresses a nonlinear distortion component remaining in the first signal to obtain a second signal; and
a third signal processor which suppresses a correlation noise component remaining in the second signal to obtain a third signal, wherein
    the second signal processor comprises a Volterra filter,
    the third signal processor comprises an ARML filter,
    the first signal processor, the second signal processor, and the third signal processor are adaptive filters,
    a control bandwidth of the first signal processor is higher than that of the second signal processor, and
    the control bandwidth of the second signal processor is higher than that of the third signal processor.

3. The apparatus according to claim 2, wherein the optical recording medium comprises not less than five information recording layers.

4. The apparatus according to claim 2, wherein
    the optical recording medium comprises an information recording layer, and a servo layer in which a guide structure is formed,
    user data recorded in the information recording layer is reproduced by using a first laser based on the guide structure, and
    disk data recorded in the servo layer is reproduced by using a second laser having a wavelength different from that of the first laser.

* * * * *